(12) United States Patent
Sahr

(10) Patent No.: US 7,876,967 B2
(45) Date of Patent: Jan. 25, 2011

(54) ICOSAHEDRAL MODIFIED GENERALIZED BALANCED TERNARY AND APERTURE 3 HEXAGON TREE

(75) Inventor: Kevin Sahr, Applegate, OR (US)

(73) Assignee: State of Oregon by and through the State Board of Higher Education, on behalf of Southern Oregon University, Ashland, OR (US)

(*) Notice: Subject to any disclaimer, the term of this patent is extended or adjusted under 35 U.S.C. 154(b) by 1020 days.

(21) Appl. No.: 11/038,484

(22) Filed: Jan. 21, 2005

(65) Prior Publication Data

US 2005/0193365 A1    Sep. 1, 2005

Related U.S. Application Data

(60) Provisional application No. 60/537,506, filed on Jan. 21, 2004.

(51) Int. Cl.
*G06K 9/36* (2006.01)
*G06K 9/48* (2006.01)
*G06K 9/54* (2006.01)
*G06K 9/60* (2006.01)
*G06T 15/30* (2006.01)
*G06T 17/20* (2006.01)

(52) U.S. Cl. .................. 382/241; 382/305; 345/423

(58) Field of Classification Search .................. 382/289, 382/302, 325, 240, 241, 305; 345/420, 423; 703/2

See application file for complete search history.

(56) References Cited

U.S. PATENT DOCUMENTS

| 3,696,566 | A | * | 10/1972 | Langner | ...................... 52/81.1 |
| 4,691,291 | A | | 9/1987 | Wolfram | |
| 4,809,202 | A | | 2/1989 | Wolfram | |
| 5,631,970 | A | | 5/1997 | Hsu | |
| 5,761,741 | A | * | 6/1998 | Robbins et al. | .............. 711/212 |
| 5,781,195 | A | | 7/1998 | Marvin | |

(Continued)

FOREIGN PATENT DOCUMENTS

CA    2 436 312    8/2003

(Continued)

OTHER PUBLICATIONS

Sahr et al. ("Discrete Global Grid Systems," Computing Science and Statistics 30, 1998, pp. 269-278).*

(Continued)

*Primary Examiner*—Yubin Hung
(74) *Attorney, Agent, or Firm*—Klarquist Sparkman, LLP

(57) ABSTRACT

A method for assigning path address-form location codes to objects represented using aperture 3 hexagon discrete global grid systems in both vector systems and bucket and raster systems in which hexagons in a first resolution are given a linear code and hexagons in subsequent finer resolutions have identifiers added to the linear code, the method iteratively applying the assigning step to further finer resolutions to a maximum resolution. In vector systems each hexagon has seven hexagons in a finer resolution and in raster and bucket systems each hexagon is assigned to be an open or closed generator class, an open generator creating a closed generator in a finer resolution, and a closed generator generating six open generator hexagons and a seventh closed generator hexagon.

29 Claims, 19 Drawing Sheets

U.S. PATENT DOCUMENTS

| | | | |
|---|---|---|---|
| 5,848,404 | A | 12/1998 | Hafner et al. |
| 6,384,826 | B1 | 5/2002 | Bern et al. |
| 7,426,455 | B1 * | 9/2008 | Antony .......................... 703/2 |
| 2002/0069018 | A1 * | 6/2002 | Brueckner et al. .......... 701/300 |
| 2004/0225665 | A1 | 11/2004 | Toyama et al. |
| 2006/0265197 | A1 | 11/2006 | Peterson |

FOREIGN PATENT DOCUMENTS

| | | |
|---|---|---|
| WO | WO 2005/013200 | 2/2005 |

OTHER PUBLICATIONS

Gargantini ("An Effective Way to Represent Quadtrees," CACM, V. 25, No. 12, Dec. 1982, pp. 905-910).*

D. White ("Global Grids from Recursive Diamond Subdivision of the Surface of An Octahedron or Icosahedron," Environmental Monitoring and Assessment 64(1), 2000, pp. 93-103).*

Middleton et al. ("Framework for Practical Hexagonal-Image Processing," J. Electronic Imaging, vol. 11(1), Jan. 2002, pp. 104-114).*

Sahr et al. ("Discrete Global Grid Systems," Computing Science and Statistics 30, 1998, pp. 269-278).*

Gargantini ("An Effective Way to Represent Quadtrees," CACM, V. 25, No. 12, Dec. 1982, pp. 905-910).*

Hou et al. ("Hierarchical Path Planning with Hexagonal Decomposition," Proc. IEEE Int'l Conf. on Systems, Man and Cybernetics, Oct. 13-16, 1991, vol. 2, pp. 1005-1010).*

Majewski et al. ("The Operational Global Icosahedral-Hexagonal Gridpoint Model GME: Description and High-Resolution Tests," AMS Journals Online, vol. 130, Issue 2, pp. 319-338).*

"Deodesic Discrete Global Grid Systems", Kevin Sahr, Denis White, and A. Jon Kimerling, *Cartography and Geographic Information Science*, vol. 30, No. 2, 2003, pp. 121-134.

"ISEA Discrete Global Grids", Dan Carr, Ralph Kahn, Kevin Sahr, and Tony Olsen, *Statistical Computing & Statiscal Graphics Newsletter*, vol. 8, No. 2/3, pp. 31-39.

Affidavit of Joseph L. Ulvr, dated Oct. 6, 2006, Ontario Superior Court of Justice, Court File No. 06-CV-35606.

Amended Statement of Defence of the Defendant Perry Peterson, dated Sep. 17, 2008, Ontario Superior Court of Justice, Court File No. 06-CV-35606.

Dutton, "Encoding and Handling Geospatial Data with Hierarchical Triangular Meshes," Department of Geography, University of Zurich, *Advances in GIs Research II, London: Taylor & Francis*, pp. 505-518, (1996).

Exhibit K to Joseph L. Ulvr Affidavit, Oct. 6, 2006.

Exhibit L to Joseph L. Ulvr Affidavit, Oct. 6, 2006.

Gilmore et al., "Hipparchus Tutorial and Programmer's Guide, Chapter 6: Working with Voronoi Cells," Feb. 27, 2004, 17 pp.

International Search Report, Dec. 17, 2004, in PCT/CA2004/001507, 2 pp.

Kobbelt, "$\sqrt{3}$-Subdivision," *Computer Sciences*, http:/www-i8.informatik.rwth-aachen.de/publications/downloads/sqrt.3, SIGGRAPH 2000: pp. 103-112 (2001).

Office Action, dated Apr. 9, 2009, issued by the Canadian Intellectual Property Office, in Canadian Patent Application No. 2,436,312, 4 pp.

Office Action, dated Oct. 30, 2008, issued by the U.S. Patent and Trademark Office, in U.S. Appl. No. 10/552,901, 23 pp.

Plaintiff's Amended Statement of Claim, dated Aug. 15, 2006, Ontario Superior Court of Justice, Court File No. 06-CV-35606.

Russell, "Spatial Data and the Voronoi Tessellation," *Dr. Dobb's Journal*, Dec. 1, 1992, 30 pp.

Sahr et al., "Discrete Global Grid Systems," *Computing Science and Statistics*, vol. 30 (1998), 10 pp.

Song et al., "Developing an Equal Area Global Grid by Small Circle Subdivision," *Discrete Global Grids*, May 8, 2002, 29 pp.

Weisstein, "Koch Snowflake," *Mathworld—A Wolfram Web Resource*, downloaded Aug. 6, 2009, 2 pp.

Written Opinion of the International Searching Authority, Dec. 17, 2004, in PCT/CA2004/001507, 4 pp.

Amendment Under 37 C.F.R. 1.114, filed with the U.S. Patent and Trademark Office on Mar. 21, 2010, in U.S. Appl. No. 10/552,901, 25 pp.

"Deodesic Discrete Global Grid Systems", Kevin Sahr, Denis White, and A. Jon Kimerling, *Cartography and Geographic Information Science*, vol. 30, No. 2, 2003, pp. 121-134.

"ISEA Discrete Global Grids", Dan Carr, Ralph Kahn, Kevin Sahr, and Tony Olsen, *Statistical Computing & Statiscal Graphics Newsletter*, vol. 8, No. 2/3, pp. 31-39 (1997).

* cited by examiner

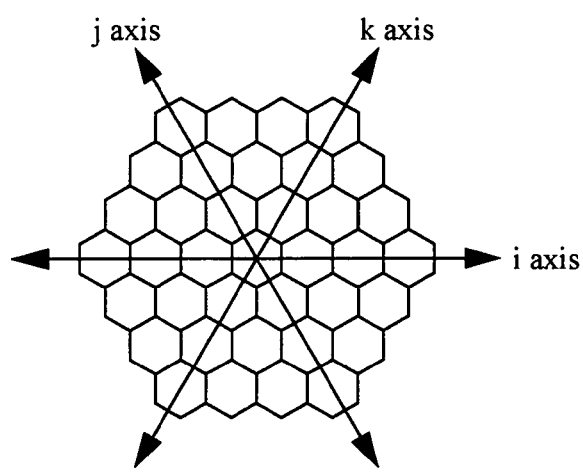 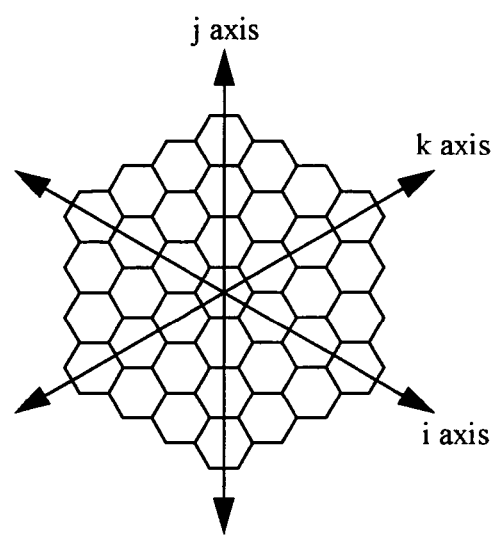
FIG. 1A                    FIG. 1B resolution K generates resolution K+1

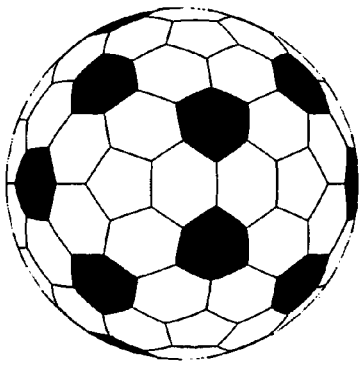
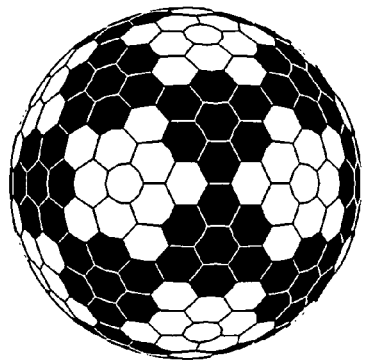
FIG 18A  FIG 18B  FIG 18C
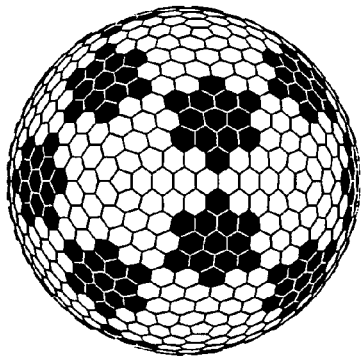
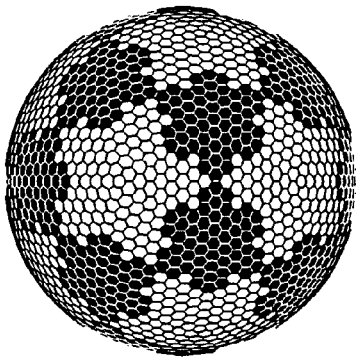
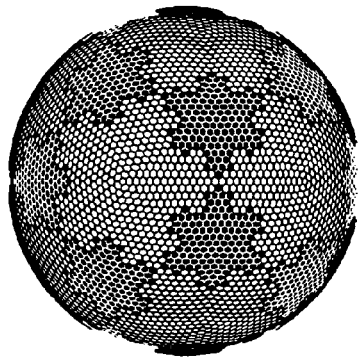
FIG 18D  FIG 18E  FIG 18F
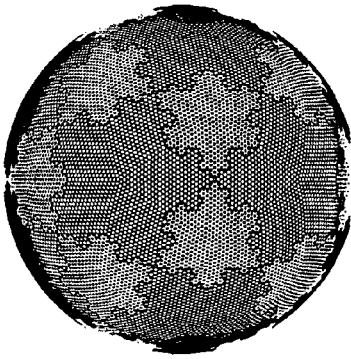
FIG 18G

ICOSAHEDRAL MODIFIED GENERALIZED BALANCED TERNARY AND APERTURE 3 HEXAGON TREE

CROSS REFERENCE TO RELATED APPLICATIONS

This application claims the benefit of U.S. Provisional Application No. 60/537,506, filed Jan. 21, 2004.

FIELD OF THE INVENTION

The present invention relates to a hierarchical location coding method for geospatial computing on icosahedral aperture 3 hexagon discrete global grid systems (DGGS).

BACKGROUND OF THE INVENTION

Calculations on computer systems involving the locations of objects situated on, or referenced to, the surface of the earth require a location coding system, a particular computer representation of geospatial location. Depending on the application, a location code may represent a zero-dimensional point, a one-dimensional line/curve, or a two-dimensional region, or a set of these location forms. A location coding must define a quantization operator which maps such locations on the earth's surface to location codes, which consist of a string of bits on modern digital computers.

As defined in (Sahr, K., D. White, and A. J. Kimerling. 2003. "Geodesic Discrete Global Grid Systems", Cartography and Geographic Information Science. 30(2):121-134), the contents of which are incorporated herein by reference, a discrete global grid (DGG) is a set of polygonal regions that partition the surface of the earth, where each region has associated with it a single point contained within it (usually the region center point). Each region/point pair is designated a cell. A discrete global grid system (DGGS) is a multi-resolution set of discrete global grids.

DGGS have been developed using multi-resolution aperture 3 hexagon grids tiled onto an icosahedron. These DGGS include the ISEA3H DGGS as defined in (Sahr, K., D. White, and A. J. Kimerling. 2003. "Geodesic Discrete Global Grid Systems", Cartography and Geographic Information Science. 30(2):121-134), the contents of which are incorporated herein by reference. The cells of a hexagon-based icosahedral DGGS always include exactly twelve pentagonal cells at each resolution; these are located at the twelve vertices of the icosahedron.

The cells of any DGGS can have at least three relationships to the geospatial locations being represented:

1. Vector systems (Dutton, G. 1989. "The fallacy of coordinates", Multiple representations: Scientific report for the specialist meeting. Santa Barbara, National Center for Geographic Information and Analysis). For each resolution in a DGGS, each point on the earth's surface is mapped to the DGG cell point associated with the DGG cell region in which it occurs. Line/Curves can be represented as an ordered vector of cell point vertexes. A region can be represented using a line/curve representation of it's boundary.

2. Raster systems. The areal units associated with the cells of the DGGS form the pixels of a raster system. For each resolution in a DGGS, each point on the earth's surface is mapped to the DGG cell region in which it occurs. Line/Curves can be represented as an ordered vector of cell regions intersected by the curve. A region can be represented using a line/curve representation of it's boundary, or as the set of pixels containing, intersecting, or contained by the location being represented.

3. Bucket systems. The areal regions associated with the DGGS cells are buckets into which data objects are assigned based on their location. Depending on the application, a data object can either be assigned to the finest resolution cell which entirely contains it, or to the coarsest resolution cell which uniquely distinguishes it from all other data objects in the data set of interest.

In order to be useful on a computer system each cell in a DGGS has assigned to it one or more unique location codes, each of which is an address consisting of a string of bits on the computing system. These location codes generally take one of two forms:

1. Pyramid Address (as outlined in Burt, P J, 1980, "Tree and Pyramid Structures for Coding Hexagonally Sampled Binary Images", Computer Graphics and Image Processing, 14:271-280). Each cell is assigned a unique location code within the DGG of corresponding resolution. This single-resolution location code may be multi-dimensional or linear. Given a resolution K cell with single-resolution location code K-add, we can designate the DGGS pyramid location code to be the pair (K, K-add). A multi-resolution DGGS address representation of a location can be constructed by taking the series of single-resolution DGG addresses ordered by increasing resolution.

Pyramid addresses are useful in applications that make use of single resolution data sets. Quantization operators to/from pyramid addresses are known for grids based on triangles, squares, diamonds, and hexagons.

2. Path Address. The resolution K quantization of a geospatial location into a DGGS cell restricts the possible resolution K+1 quantization cells to those whose regions overlap or are contained within the resolution K cell. We can construct a spatial hierarchy by designating that each resolution K cell has as children all K+1 cells whose regions overlap or are contained within it's region. A path address is one which specifies the path through a spatial hierarchy that corresponds to a multi-resolution location quantization. Path addresses are often linear, with each digit corresponding to a single resolution and specifying a particular child cell of the parent cell specified by the address prefix.

The reduction in redundant location information allows path addresses to be smaller than pyramid addresses. And because the number of digits in a location code corresponds to the maximum resolution, or precision, of the address, path addresses automatically encode their precision (Dutton, G. 1989. "The fallacy of coordinates", Multiple representations: Scientific report for the specialist meeting. Santa Barbara, National Center for Geographic Information and Analysis).

Path addresses are also used to enable hierarchical algorithms. In particular, the coarser cell represented by the prefix of a location code can be used as a coarse filter for the proximity operations containment, equality, intersection/overlap, adjacency, and metric distance. These proximity operations are the primary forms of spatial queries used in spatial databases, and such queries are thus rendered more efficient by the use of path addresses. For example, take a system where data object boundaries are assigned to the smallest containing bucket cell. A query may ask for all data objects whose locations intersect a particular region. We can immediately discard from consideration all objects in bucket cells that do not intersect the smallest containing bucket cell of the query region (Samet, H. 1989. The Design and Analysis of Spatial Data Structures. Menlo Park, Calif.: Addison-Wesley).

Path addresses are usually associated with spatial hierarchies which form traditional trees, where each child has one and only one parent. Such hierarchies include those created by recursively subdividing square, triangle, or diamond cell polygons. However, the spatial hierarchies formed by aperture 3 hexagon grids do not form trees; each cell can have up to three parents. For this reason aperture 3 hexagon grids have previously been addressed using pyramid addressing systems.

SUMMARY OF THE INVENTION

The present invention overcomes the deficiencies of the prior art by defining a method for assigning path address-form location codes to objects represented using aperture 3 hexagon DGGS. A method called modified generalized balanced ternary (MGBT) is introduced that specifies the assignment of path address-form location codes for cases when a planar aperture 3 hexagon grid is used as a vector system. A method called the aperture 3 hexagon tree (A3HT) is introduced that specifies the assignment of path address-form location codes for cases when a planar aperture 3 hexagon grid is used as a raster or bucket system. The method and system of the present invention further specify one possible efficient tiling of planar patches of these path address hierarchies onto the icosahedron, resulting in the icosahedral MGBT (iMGBT) and icosahedral A3HT (iA3HT) respectively. This fully specifies path address-form location codes for aperture 3 hexagon DGGS such as the ISEA3H when used as a vector, raster, or bucket system.

The present system further specifies a transformation to and from these location codes and an existing pyramid code system. Since algorithms exist for the quantization of common location forms (such as latitude/longitude coordinates) to/from these pyramid codes this fully specifies the quantization of location forms to/from the iMGBT and iA3HT systems.

In one broad aspect, therefore, the present invention relates to a method for assigning, in a vector system, path address-form location codes to objects represented using aperture 3 hexagon discrete global grid system where each hexagon in a first resolution has seven hexagons associated therewith in a next finer resolution to the first resolution, said seven hexagons being centered on each of the vertices of the first resolution hexagon and on the center of the first resolution hexagon, the method comprising the steps of specifying a linear code for a first resolution hexagon, assigning an identifier to each of the seven hexagons in the next finer resolution to the first resolution, and iteratively applying the assigning step to further finer resolutions until a maximum resolution is achieved.

In another broad aspect, the present invention relates to a method for assigning, in a bucket or a raster system, path address-form location codes to objects represented using aperture 3 hexagon discrete global grid system, the method comprising the steps of assigning a hexagon in a first resolution as an open generator type or a closed generator type, if the first resolution hexagon is an open generator type, creating a single hexagon in a next finer resolution to the first resolution, said single hexagon being a closed generator type hexagon and centered on the first resolution hexagon, if the first resolution hexagon is a closed generator type, creating seven hexagons in a next finer resolution to the first resolution, the seven hexagons including a closed generator hexagon centered on the center of the first resolution hexagon and the remaining six hexagons each being an open generator type and centered on the vertices of the first resolution hexagon, specifying a linear code for the first resolution hexagon, adding a first identifier to a hexagon with the same center as the first resolution hexagon and of the next finer resolution to the first resolution hexagon, adding identifiers to any hexagons in the next finer resolution to the first resolution hexagon being centered on the vertices of the first resolution hexagon, and iteratively applying the creating and adding steps to further finer resolutions of hexagons until a maximum resolution is achieved.

BRIEF DESCRIPTION OF THE DRAWINGS

The present invention will be better understood with reference to the drawings in which:

FIG. 1A is a diagram showing a three-axis hexagon coordinate system in a first alignment;

FIG. 1B is a diagram showing a three-axis hexagon coordinate system in a second alignment;

FIGS. 18A-18G illustrate the first seven resolutions of the iA3HT generation pattern on the ISEA3H DGGS.

DETAILED DESCRIPTION

Reference is now made to FIG. 1. Traditional planar Cartesian coordinate systems employ two coordinate axes that are perpendicular to each other. Hexagon systems, however, naturally form three axes that are at 120 degree angles to each other. There are two natural orientations of these three axes relative to the traditional Cartesian coordinate system.

The first orientation as illustrated in FIG. 1A can be designated as Class I, and the orientation illustrated in FIG. 1B can be designated as Class II.

Of the I, J and K axes, two of these axes are sufficient to uniquely identify each hexagon within a hexagon coordinate system. Quantization to/from Cartesian coordinates is known (van Roessel, J. 1988. "Conversion of Cartesian coordinates from and to generalized balanced ternary addresses." Photogrammetric Engineering and Remote Sensing. 54(11):1565-1570). In addition, two-axes coordinate systems have been used in the development of a number of algorithms for hexagon grids, including:

metric distance (Luczak, E., and A. Rosenfeld. 1976. "Distance on a Hexagonal Grid." IEEE Transactions on Computers. C-25(5):532-533)
   vector addition and subtraction (Snyder, W., H. Qi, and W. Sander. 1999. "A Coordinate System for Hexagonal Pixels", SPIE, San Diego, February 1999)
   neighbor identification (Snyder, W., H. Qi, and W. Sander. 1999. "A Coordinate System for Hexagonal Pixels", SPIE, San Diego, February 1999)
   adapted Bresenham's line and circle rasterization (Wuthrich, C. A., and P. Stucki. 1991. "An algorithmic comparison between square- and hexagonal-based grids." CVGIP: Graphical Models and Image Processing. 53(4):324-339)
   edge detection (Abu-Bakar, S. and R. J. Green. 1996. "Detection of edges based on hexagonal pixel formats." Proceedings of ICSP. pp. 1114-1117)
   line-of-sight (Verbrugge, C. 1997. "Hex grids." Unpublished paper. McGill University)
   field-of-view (Verbrugge, C. 1997. "Hex grids." Unpublished paper. McGill University)
   image gradient determination (Snyder, W., H. Qi, and W. Sander. 1999. "A Coordinate System for Hexagonal Pixels", SPIE, San Diego, February 1999)
   variable conductance diffusion (Snyder, W., H. Qi, and W. Sander. 1999. "A Coordinate System for Hexagonal Pixels", SPIE, San Diego, February 1999)

Any alternative location coding for a hexagon grid (such as the MGBT and A3HT systems discussed below) trivially implement these algorithms provided a mapping is defined between the alternative system and the two-axes coordinate system. Location codes in the alternative coding are converted to two-axes codes, and the algorithm is performed on the two-axes codes. Any resulting location codes are converted back to the alternative location coding.

Figure 2:
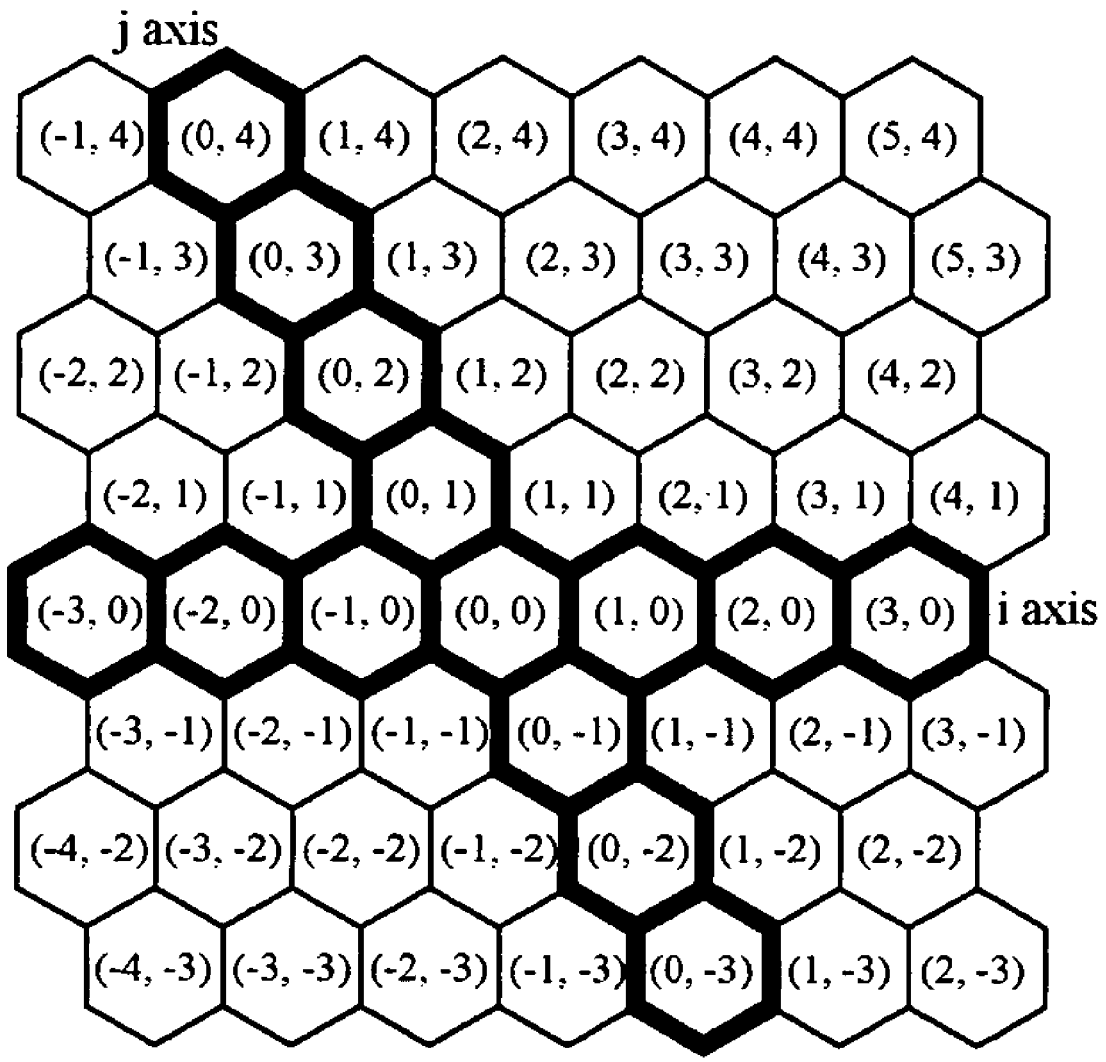
FIG. 2 is a Class 1 two-dimensional integer coordinate system.

Reference is now made to FIG. 2. The I and J axes are chosen as a coordinate system basis because they are most useful in constructing pyramid addresses for icosahedron-based DGGSs. The resulting coordinate system is the two-dimensional integer (2di) coordinate system as illustrated in FIG. 2. According to the method and system of the present invention, a multi-resolution aperture 3 hexagon grid system may be formed as follows.

Figure 3:
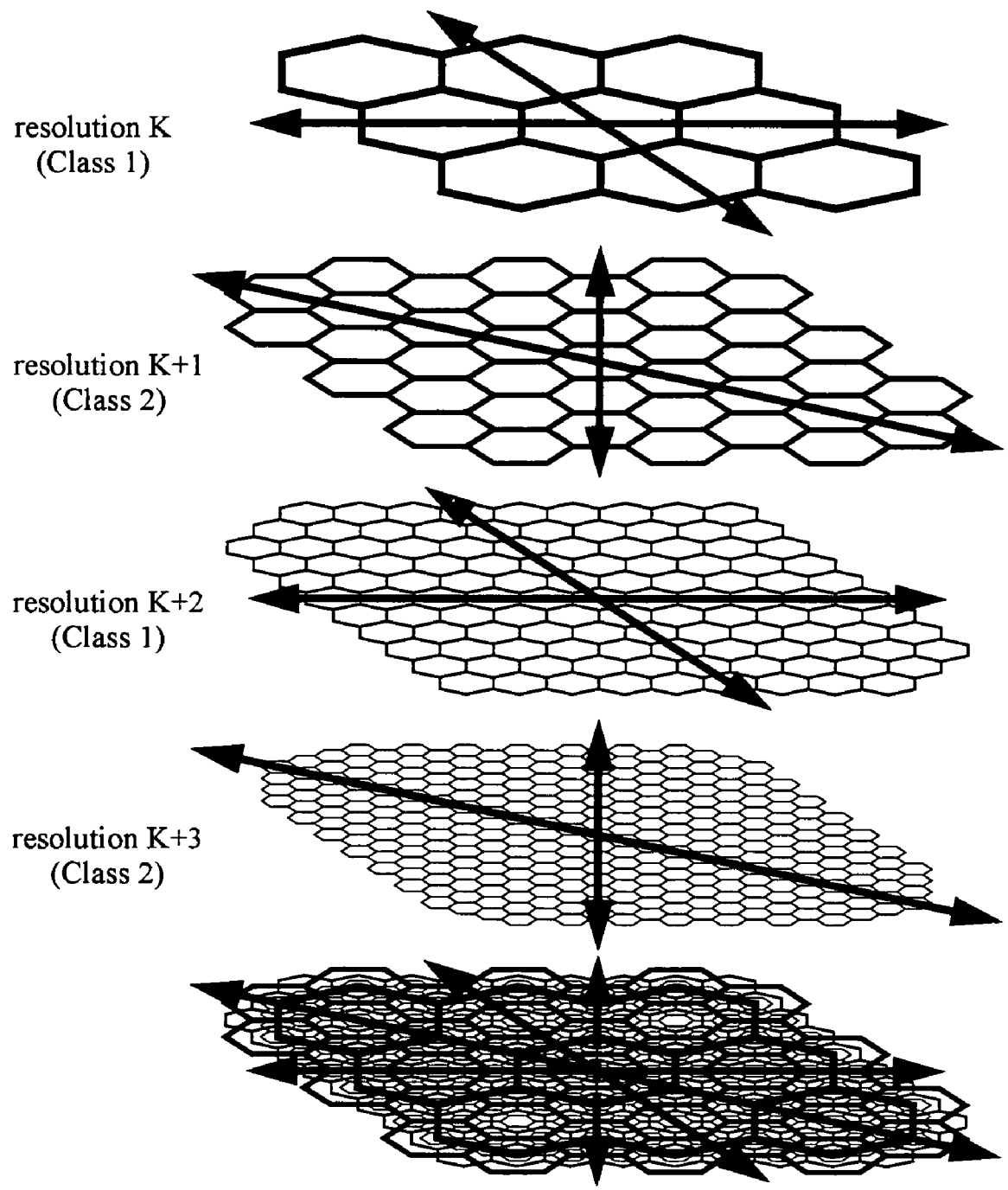
FIG. 3 is a representation of four resolutions of an aperture 3 hexagon grid system.

Reference is made to FIG. 3. A single-resolution Class 1 hexagon grid is formed and designated as a resolution K grid. To form the next finer grid (resolution K+1), a Class 2 hexagon grid is created consisting of hexagons with exactly one-third the area of the resolution K hexagons and with the resolution K+1 hexagons centered on the vertices and center-points of the resolution K hexagons.

To obtain finer resolution hexagons, the above process is repeated to the desired number of resolutions, alternating between Class 1 and Class 2 grids at each successive resolution, as seen in FIG. 3.

As one skilled in the art will appreciate, the series may be started with a Class 2 grid and created with the successive resolutions of alternating classes.

Figure 4:
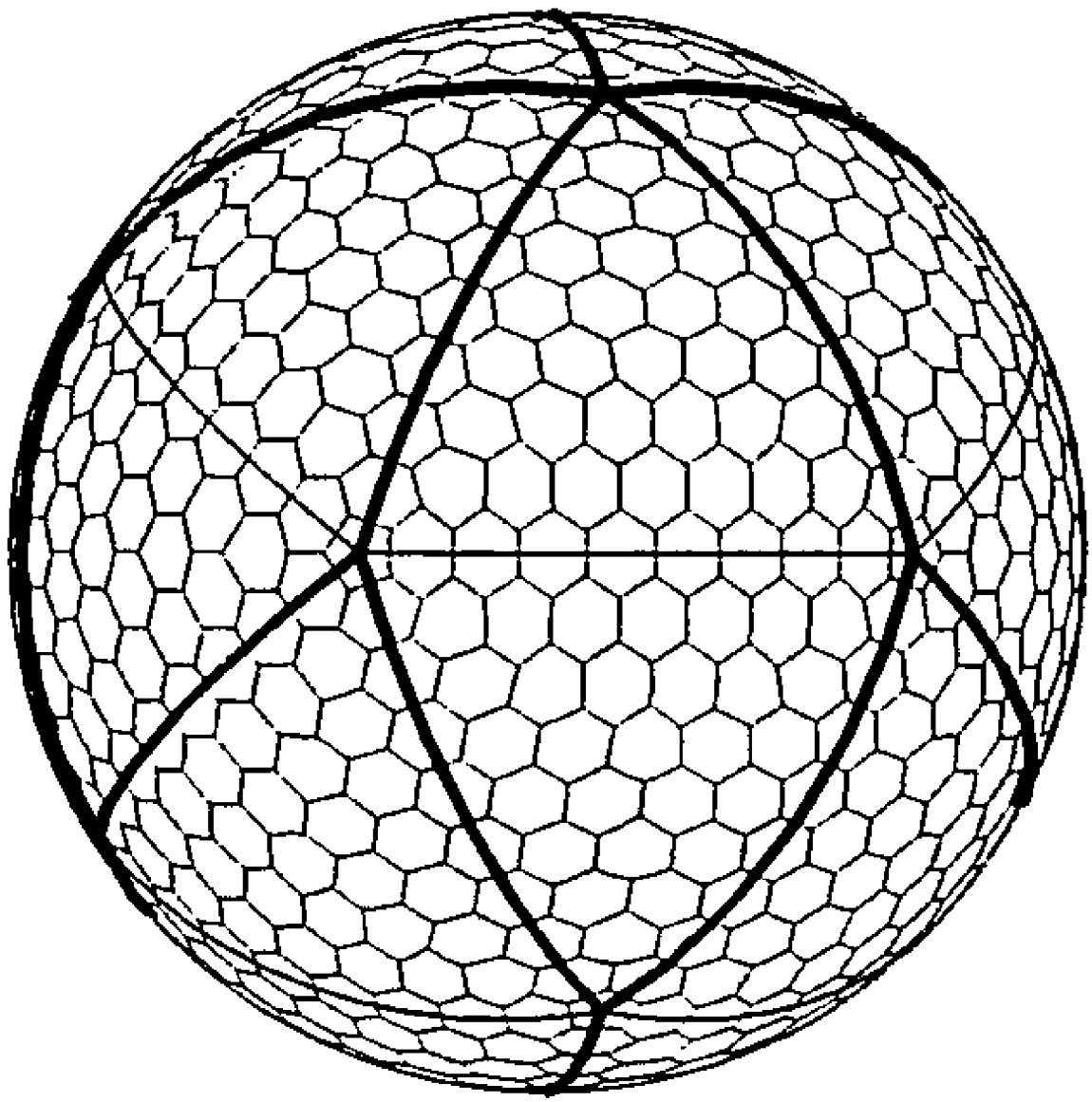
FIG. 4 is a diagram showing the icosahedron divided up into 10 quadrilaterals.
Figure 5:
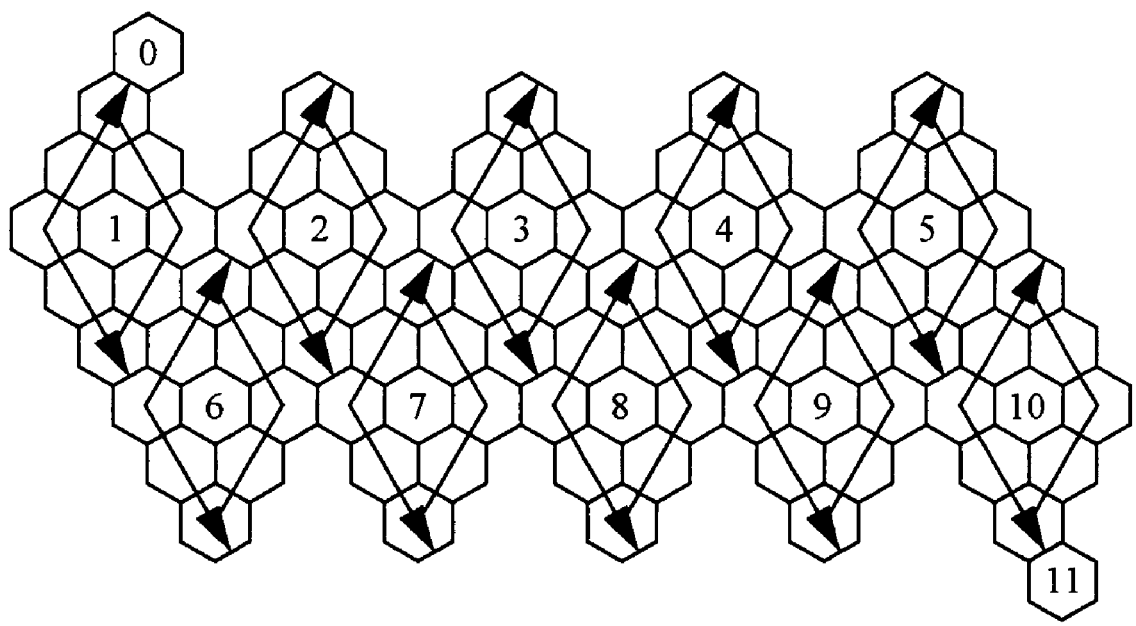
FIG. 5 shows the icosahedron unfolded onto the plane with numbered 2di coordinate systems.

The icosahedron can be tiled with 2di coordinate systems by pairing the 20 triangular faces into 10 quadrilaterals as illustrated in FIG. 4. Each 2di coordinate system origin corresponds to one of the pentagonal vertex cells. Two pentagonal vertex cells are left-over and can be treated as single-cell 2di coordinate systems at every resolution. FIG. 5 shows 2di coordinate systems on an icosahedron unfolded onto the plane and given one possible numbering. The pentagonal cells have been drawn as hexagons.

A unique pyramid address of the form $\{r, [q, (i,j)]\}$ may be assigned to each cell in the multi-resolution grid, where r is the resolution of the hexagon, q is the quadrilateral 2di coordinate system on which the cell occurs, and (i,j) is the 2di address of the hexagon on the quadrilateral q resolution r grid. Class 2 resolutions do not conveniently follow the Class 1 coordinate axes naturally defined by the quadrilateral edges. We note that for any Class 2 resolution K there are Class 1 resolution K+1 cells centered on each resolution K cell. Thus without ambiguity we can assign to each resolution K cell the coordinates of the class 1 resolution K+1 cell centered upon it. This icosahedral coordinate system is designated the q2di (quadrilateral 2di) system (Sahr, K. 2002. DGGRID: User Documentation for Discrete Global Grid Software. 27 pp.)

Figure 6:
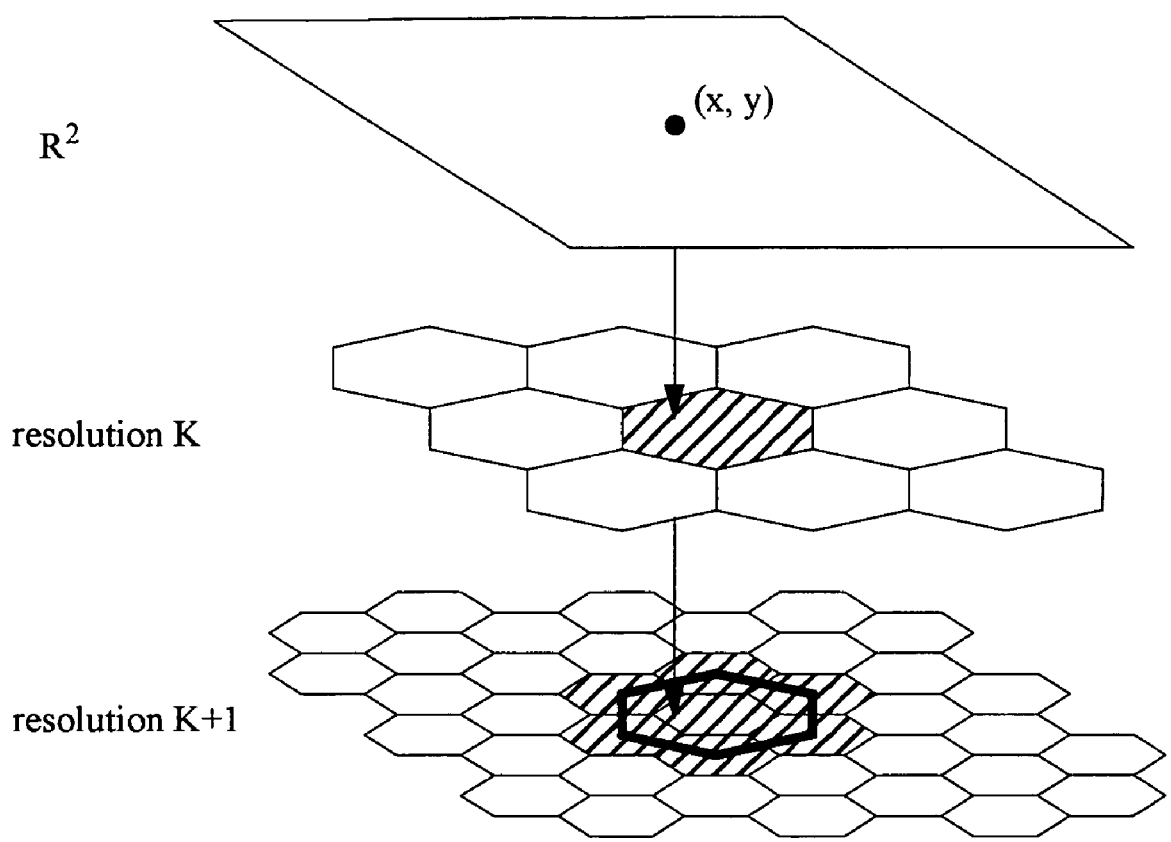
FIG. 6 illustrates the relationship between a resolution K point quantization and possible resolution K+1 quantizations of the same point.

Let (x, y) be a point location on the plane. Then a resolution K aperture 3 hexagon grid quantization of this point restricts the possible resolution K+1 quantization of the point to the seven resolution K+1 hexagons that overlap the resolution K hexagon. This is illustrated in FIG. 6.

A common form for linear codes consists of a string of digits, where each digit specifies a choice among the possible hexagons at a particular resolution. Given a linear code for a resolution K cell in a planar aperture 3 hexagon grid, a multi-scale hierarchical coding scheme can be specified by assigning specific digits to each of the seven possible resolution K+1 cells, and then applying this scheme iteratively until the desired maximum resolution is achieved.

Figure 7A:
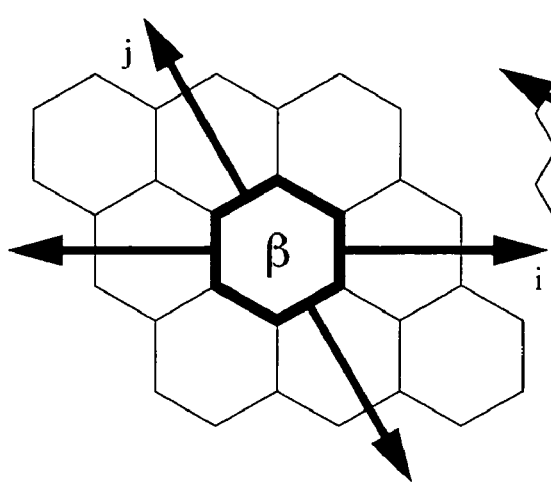
FIG. 7A illustrates a class 1 resolution K address.
Figure 7B:
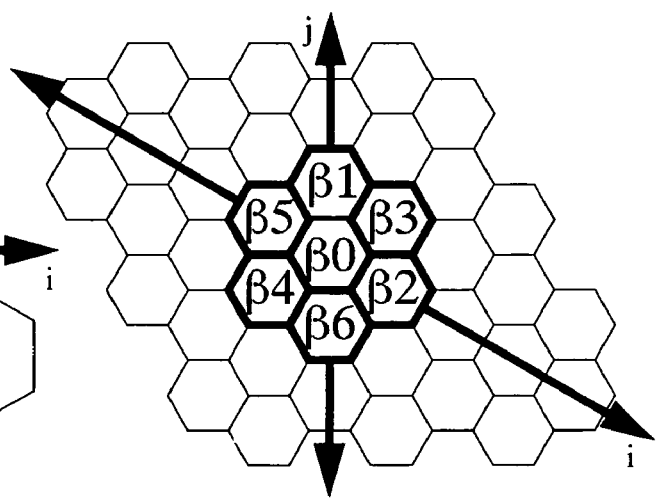
FIG. 7B illustrates the assignment of resolution K+1 address digits.
Figure 8A:
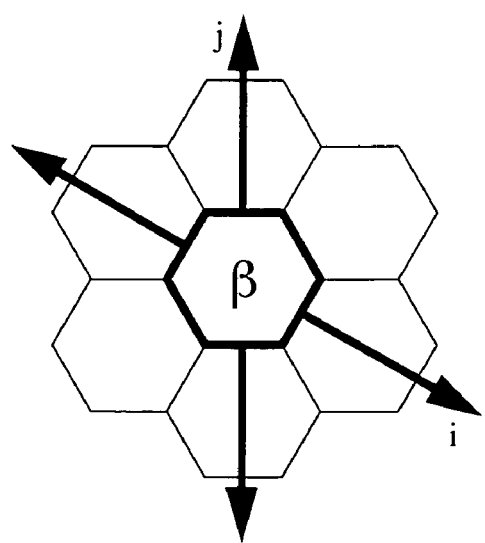
FIG. 8A illustrates a class 2 resolution K address.
Figure 8B:
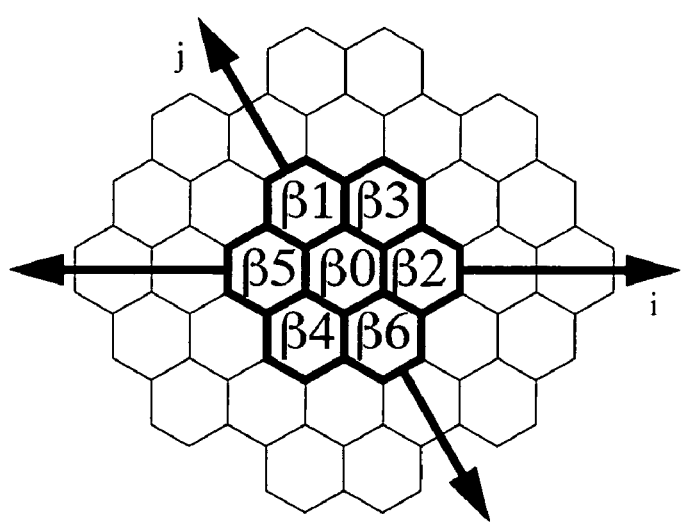
FIG. 8B illustrates the assignment of resolution K+1 address digits.

An address can be assigned in a fashion inspired by the Generalized Balance Ternary (GBT) system for hexagon aggregation and thus we call this system Modified GBT (MGBT). FIGS. 7 and 8 show the assignment of resolution K+1 address digits based on class 1/class 2 resolution K addresses respectively.

Since at each resolution there are seven possible hexagons, it is possible for each digit to be represented in three bits. Note that three bits can represent eight distinct digits. The decimal digits 0-6 have been assigned according to the above. The remaining eighth digit, decimal 7 or binary 111, can serve a number of useful functions. If the addresses are variable length, then a 7-digit can be concatenated to an address to indicate address termination. If the addresses are fixed length, a 7-digit can be used to indicate that the remaining high resolution digits are all center digits (i.e., zero), and therefore that additional resolution will not add information to the location.

MGBT addressing can be applied to the earth's surface by tiling an aperture 3 hexagon DGGS such as the ISEA3H with MGBT tiles. Tiles centered on the twelve icosahedral vertices form pentagons and thus require special tiling units. These can be constructed by deleting one-sixth of the sub-hierarchy generated in the hexagon case. These are indicated using the procedure outlined for MGBT tiles except that pentagonal tiles have a single sub-digit sequence deleted. That is, for pentagonal tiles with address A, all sub-tiles are indexed as per the corresponding MGBT indexing except that sub-tiles with sub-indexes of the form AZd are not generated, where Z is a string of 0 or more zeroes and d is the sub-digit sequence (1, 2, 3, 4, 5, or 6) chosen for deletion. All hierarchical descendants of such tiles are likewise not indexed. We use MGBT-d to indicate an MGBT tile with sub-digit sequence d deleted (e.g., MGBT-2 would indicate an MGBT tile with sub-digit sequence 2 chosen for deletion).

Figure 9:
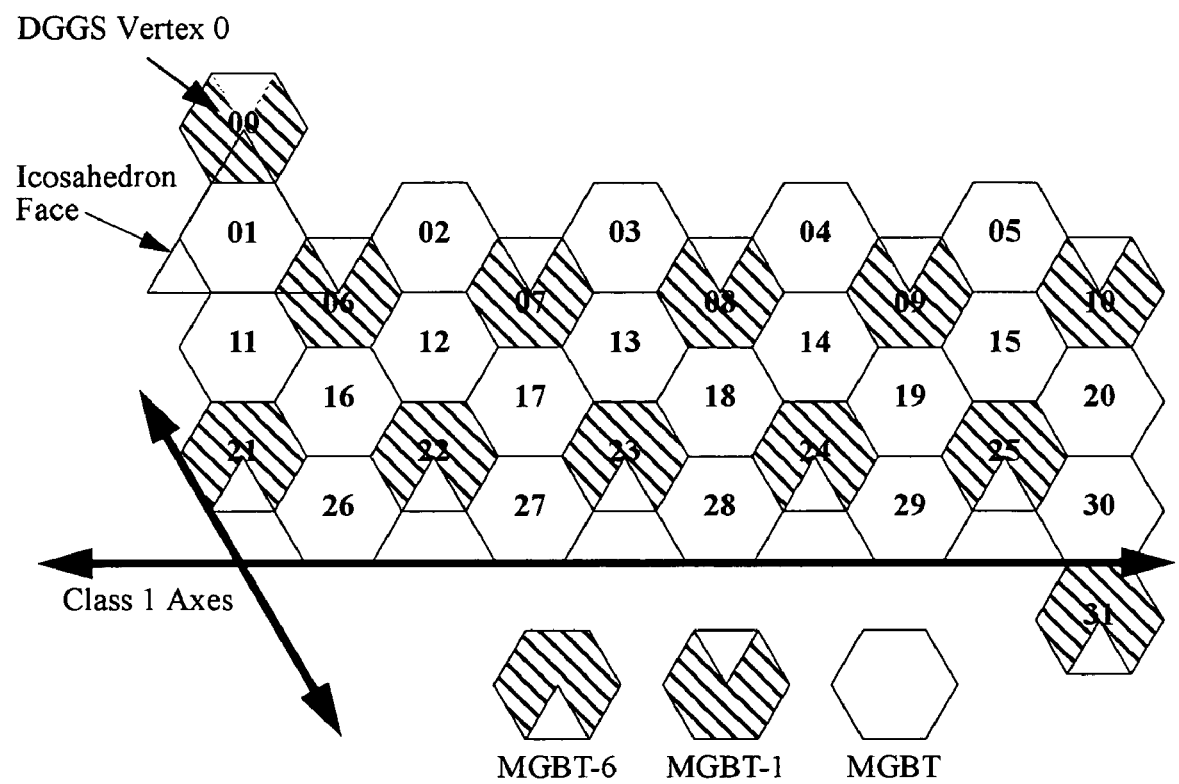
FIG. 9 shows iMGBT tiling on an unfolded icosahedron.

Given hexagonal and pentagonal MGBT tiles, we may tile the icosahedron to create the icosahedral MGBT (iMGBT). In order to fully specify a geospatial coding system based on the iMGBT, a fixed orientation must be specified for each tile. One approach to achieving this is to unfold the icosahedron onto the plane and then specify that each tile be oriented consistently with this planer tiling. FIG. 9 shows one such orientation. As one skilled in the art would appreciate, the specification of a single triangular face on the unfolded icosahedron in FIG. 9 unambiguously specifies the remaining relative positions of the other 19 icosahedral faces. Each base tile is labeled with a tile number that designates the base geospatial code of that tile.

Based on the above, an iMGBT location code on an icosahedral aperture 3 hexagon DGGS can be indexed in at least four easily inter-convertible forms.

1. Character string code form. The location code consists of a string of digits beginning with the two-digit base tile code (00, 01, 02, . . . 31) followed by the digit string corresponding to the appropriate address of each finer resolution within the tile.
2. Integer code form. The character string code form may be interpreted and stored as a single integer value.
3. Modified integer code form. When displaying integer values leading zeroes are usually removed. This will result in differences in the number of digits between codes on base tiles 00-09 and those of the same resolution but on other base tiles. This can be remedied by adding the value of 40 to each of the base tile values so that they are numbered 40, 41, . . . 71. Note that since digits 4-7 are not used as leading digits in the integer code form, these address can be unambiguously distinguished as being modified integer codes.
4. Packed code form. Under this form, the base tile codes are stored as five-digit binary numbers. Sub-codes within each tile are stored as a packed series of three-bit binary digits (as described above) and appended to the base tile number to fully specify a geospatial code. Under this scheme, codes up to resolution 10 can be stored in 32 bits of contiguous storage, and codes up to resolution 20 can be stored in 64 bits of contiguous storage.

An iMGBT code for a point location can be truncated such that any prefix of the code yields a valid quantification of the point location at a coarser grid resolution. This allows prefixes of the code to be used as a coarse filter for the proximity operations equality, adjacency, and metric distance.

While useful as a vector location system, iMGBT effectively addresses sub-regions of cells and thus assigns multiple codes to many of the cells in an aperture 3 hexagon DGGS. This makes it unsuitable for raster or bucket systems, where it is useful to have a specific unique code for each cell. For applications where a unique code is required we introduce the planar aperture 3 hexagon tree (A3HT).

Figure 10:
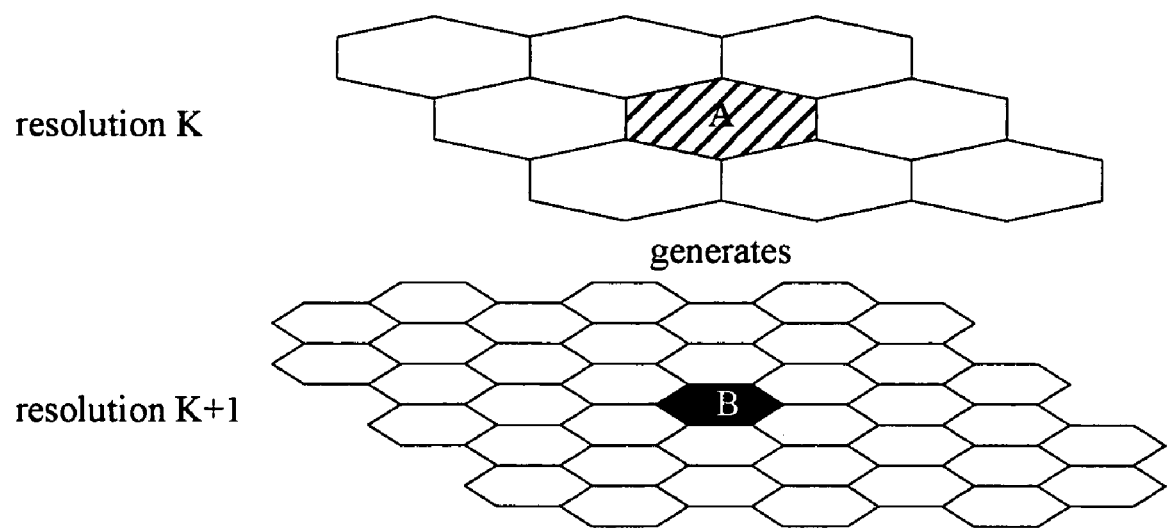
FIG. 10 shows the hexagons generated by an aperture 3 hexagon tree open generator hexagon.

Each hexagon in an A3HT is assigned one of two generator hexagon types: open (type A), or closed (type B). As seen in FIG. 10, an open generator at resolution K generates a single resolution K+1 hexagon that is a closed generator centered on itself.

Figure 11:
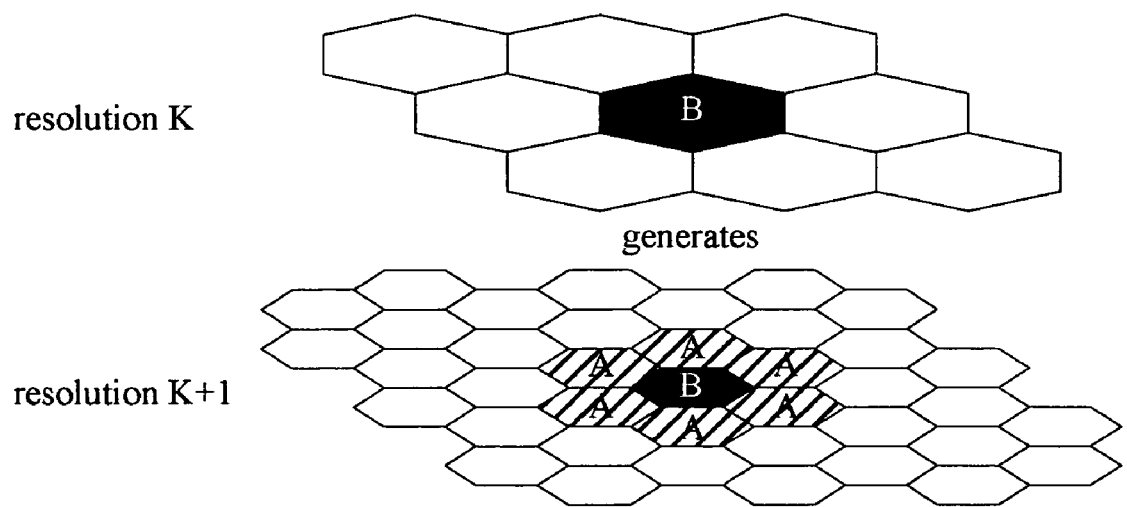
FIG. 11 shows the hexagons generated by an aperture 3 hexagon tree closed generator hexagon.

Reference is now made to FIG. 11. A closed generator hexagon at resolution K also generates a single resolution K+1 closed generator hexagon at its center. The closed generator in addition generates six resolution K+1 open generator hexagons, one centered at each of its six vertices.

Figure 12:
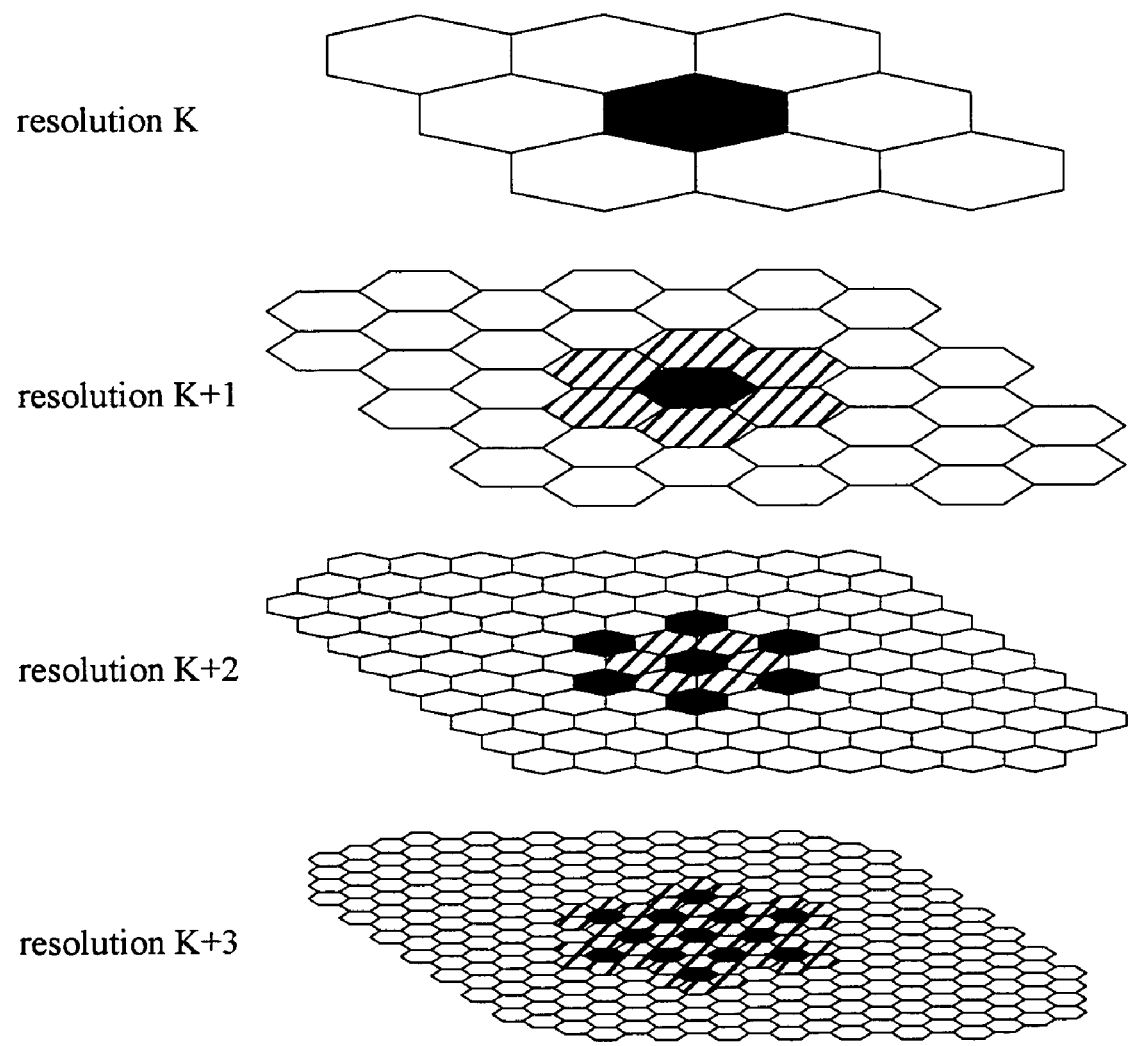
FIG. 12 shows the generation of four resolutions of an aperture 3 hexagon tree grid from a closed initial generator.

An A3HT of arbitrary resolution can be created by beginning with a single open or closed hexagon and then recursively applying the above generator rules until the desired resolution is reached. FIG. 12 shows the first four resolutions of an A3HT generated by a resolution K closed generator hexagon.

Figure 13A:
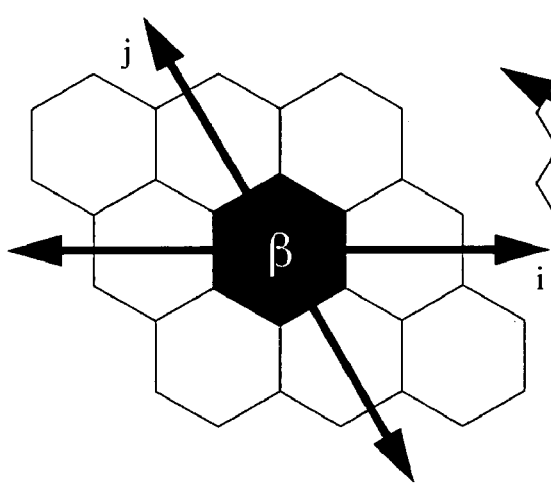
FIG. 13A shows a Class 1 closed parent.
Figure 13B:
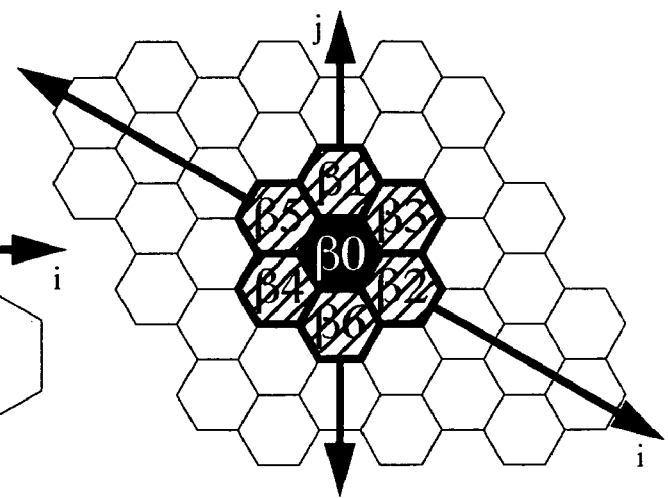
FIG. 13B shows the aperture 3 hexagon tree addresses generated by a Class 1 closed parent.
Figure 14A:
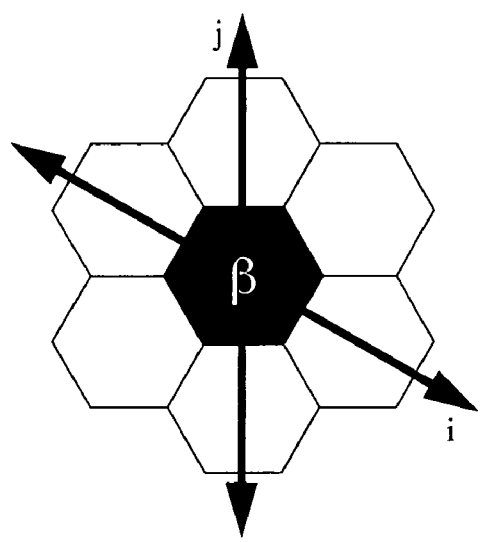
FIG. 14A shows a Class 2 closed parent.
Figure 14B:
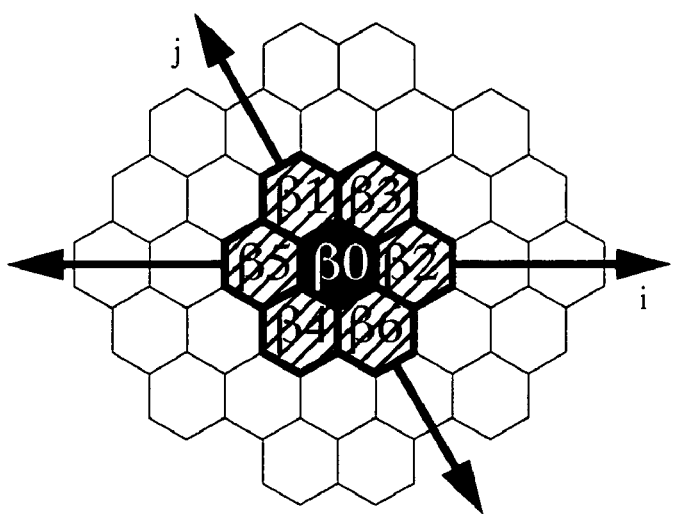
FIG. 14B shows the aperture 3 hexagon tree addresses generated by a Class 2 closed parent.

Hexagons in an A3HT may be addressed by using a selection of MGBT codes. In all cases (Class 1 or Class 2, open or closed generator), the address of centroid children are formed by concatenating a zero digit with the parent hexagon address. The addresses of vertex children of closed generators are formed by concatenating one of the digits 1-6 with the parent hexagon address; the particular digit chosen is based on the parent alignment class and the direction of the child relative to its generated parent as illustrated for closed Class 1 and Class 2 parent hexagons in FIGS. 13 and 14 respectively.

A3HT addressing can be applied to the earth's surface by tiling an aperture 3 hexagon DGGS such as the ISEA3H with A3HT tiles. Tiles centered on the twelve icosahedral vertices form pentagons and thus require special tiling units.

Figure 15:
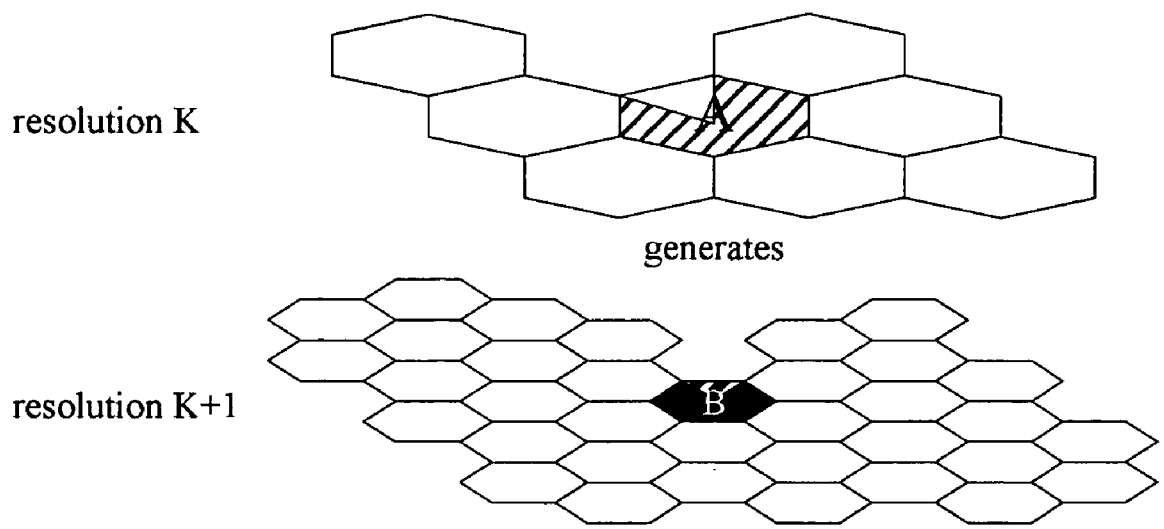
FIG. 15 shows the cells generated by an aperture 3 pentagon tree open generator pentagon unfolded onto the plane.

Aperture 3 pentagon tree (A3PT) tiling units are generated similarly to A3HT tiles except that one-sixth of the sub-hierarchy is deleted. Each pentagon in an A3PT is assigned one of two generator pentagon types: open (type A) or closed (type B). As seen in FIG. 15, an open A3PT generator at resolution K generates a single resolution K+1 pentagon that is a closed generator centered on itself.

Figure 16:
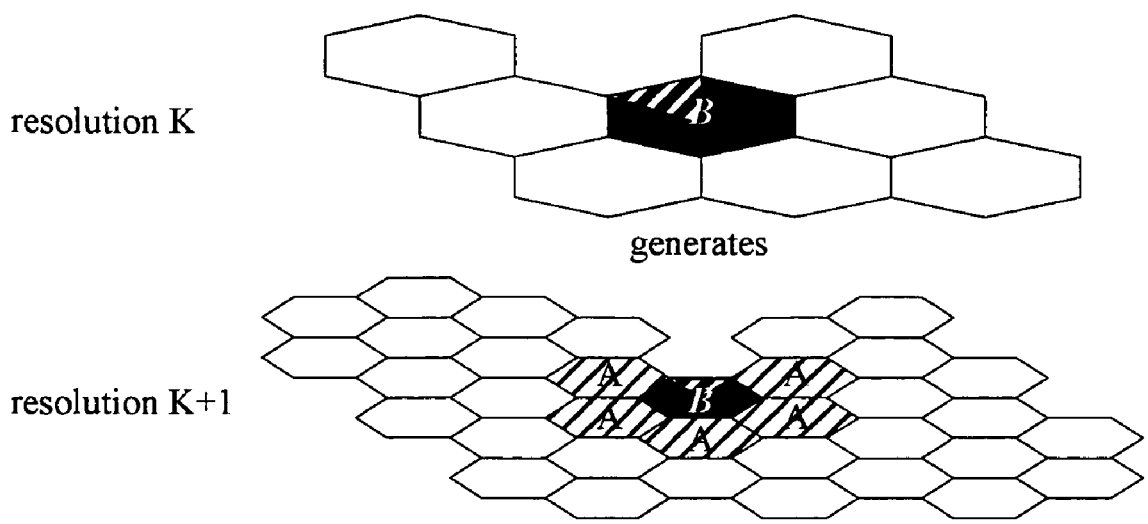
FIG. 16 shows the cells generated by an aperture 3 pentagon tree closed generator pentagon unfolded onto the plane.

As illustrated in FIG. 16, a closed A3PT generator at resolution K also generates a single resolution K+1 closed A3PT generator pentagon at its center, but in addition it generates five resolution K+1 open A3HT generator hexagons, one centered at each of its five vertices. An A3PT of arbitrary resolution can be created by beginning with a single open or closed pentagon and then recursively applying the above generator rules until the desired resolution is reached.

A3PT tiles can be indexed using the procedure outlined for A3HT tiles except that pentagon tiles have a single sub-digit sequence deleted. That is, for an A3PT tile with an address A, all sub-tiles are generated as per the corresponding A3HT indexing except that sub-tiles with indexes of the form AZd are not generated, where Z is a string of 0 or more zeroes and d is the sub-digit sequence (1, 2, 3, 4, 5, or 6) chosen for deletion. All hierarchical descendants of such tiles are likewise not generated.

A3PT-d is used to indicate an A3PT tile with the sub-digit sequence d deleted. For example, A3PT-2 would indicate an A3PT tile with the sub-digit sequence 2 chosen for deletion.

Figure 17:
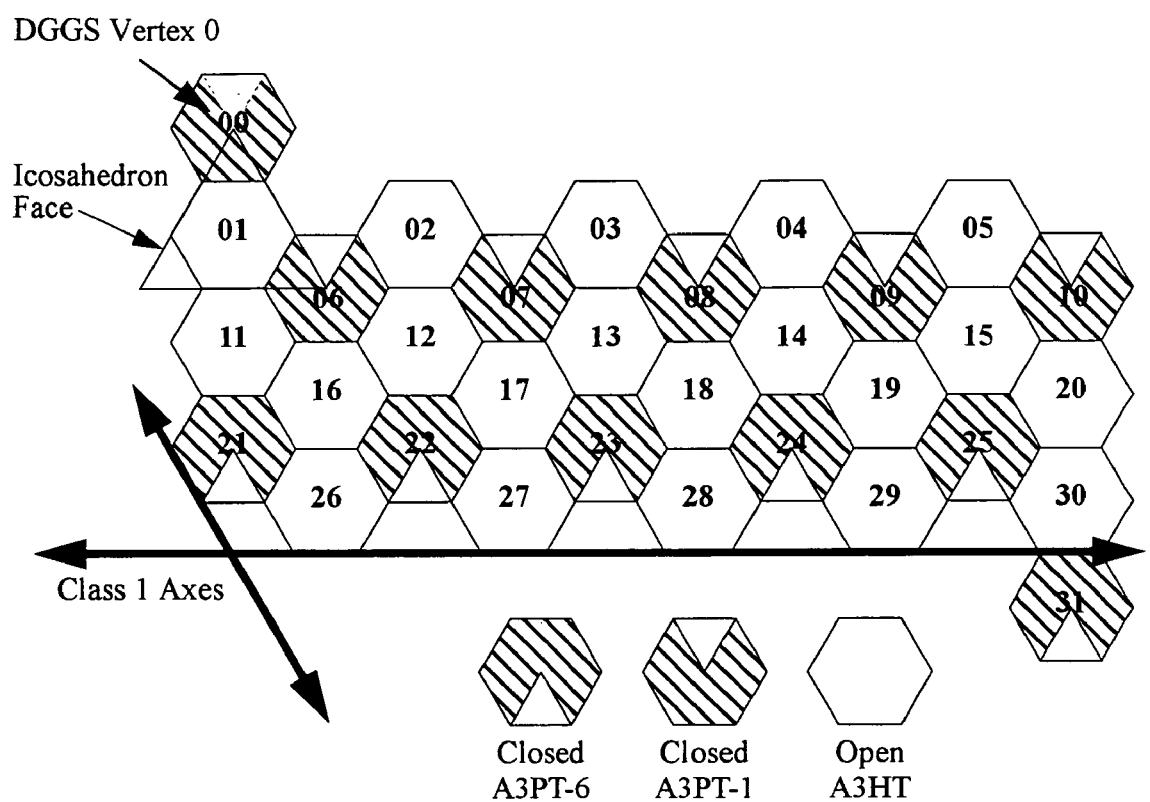
FIG. 17 shows iA3HT tiling on an unfolded icosahedron.

Given A3HT and A3PT tiles, we may tile the icosahedron to create the icosahedral A3HT (iA3HT). In order to fully specify a geospatial location coding system based on the iA3HT, a fixed orientation must be specified for each tile. One approach to achieving this is to unfold the icosahedron into the plane and then specify that each tile be oriented consistently with this planer tiling. FIG. 17 shows one such orientation. As one skilled in the art would appreciate, the specification of a single triangular face on the unfolded icosahedron in FIG. 17 unambiguously specifies the remaining relative positions of the other 19 icosahedral faces. Each base tile is labeled with a tile number that designates the base geospatial code of that tile.

Reference is now made to FIG. 18. FIG. 18 illustrates the first seven resolutions of an A3HT generation pattern on the ISEA3H DGGS.

Based on the above, an iA3HT location code on an icosahedral aperture 3 hexagon DGGS can be indexed using any of the four code forms previously defined for the iMGBT: character string code form, integer code form, modified integer code form, or packed code form.

We note that since each open A3HT or A3PT generator generates only a single center hexagon, every 1-6 digit in an iA3HT location code must be followed by a 0 digit. A first order compression of the codes can be achieved by eliminating these redundant 0 digits.

The development of algorithms that can operate on iA3HT codes is ongoing. Until such algorithms are available, the existing body of algorithms for 2di pyramid addresses can be exploited by specifying algorithms to convert between the two systems. First we define algorithms for conversions between planar A3HT and 2di pyramid systems. We then extend these algorithms to DGGS by defining the conversion between q2di coordinates and iA3HT codes.

The definitions that follow assume that the root (resolution 0 hexagon) of all A3HT indices are Class 1 type A generators. Algorithm definitions for initial generators that are Class 2 and/or type B follow trivially from the algorithms given below. The existence of the following known or trivial algorithms is also assumed:

digit:A3HT×integer->integer. Returns a specific resolution digit from an A3HT code.

distance:2di×2di->integer. Return the metric distance between two 2di addresses.

generateNextLevel:A3HT->{A3HT}. Returns the child indices of an A3HT code.

isClass1:A3HT->boolean. Returns whether or not an A3HT code is Class 1.

isTypeA:A3HT>boolean. Returns whether or not an A3HT code is type A.

resolution:A3HT->integer. Returns the resolution of an A3HT code.

resolve:A3HT×integer->A3HT. Extend an A3HT code to a specified resolution by padding it with trailing 0's.

Conversion from A3HT to 2di pyramid coordinates

The algorithm a3ht2Coord2di gives a 2di address corresponding to a given A3HT code. Algorithms used within this definition are given following the definition.

ALGORITHM a3ht2Coord2di:A3HT>2di

Convert A3HT code ndx to a 2di address coord of the same resolution as ndx.

```
BEGIN a3ht2Coord2di
coord <- (0, 0)
sameClass <- true
resOffset <- 0
for i = resolution(ndx) to 0 step by -1
    if sameClass
        coord <- coord + sameClassDownN(digit(ndx, i), resOffset)
    else
        if (isClass1(ndx))
            coord <- coord + class2downOne(digit(ndx, i)) * 3.0(resOffset-1)/2
        else
            coord <- coord + class1downOne(digit(ndx, i)) * 3.0(resOffset-1)/2
        end if-else
    end if-else
    sameClass <- not sameClass
    resOffset <- resOffset + 1
end for
return coord
END a3ht2Coord2di
```

ALGORITHM sameClassDownN:integer×integer->2di

Given an A3HT digit digit calculate the corresponding 2di coord on the grid n resolutions finer than the grid on which the A3HT digit is defined. Assumes both grids are of the same class.

```
BEGIN sameClassDownN
if digit = 0
    coord <- (0, 0)
else if digit = 1
    coord <- (0, 1)
else if digit = 2
    coord <- (1, 0)
else if digit = 3
    coord <- (1, 1)
else if digit = 4
    coord <- (-1, -1)
else if digit = 5
    coord <- (-1, 0)
else if digit = 6
    coord <- (0, -1)
end if-else
coord <- coord * 3.0n/2
return coord
END sameClassDownN
```

ALGORITHM class2downOne:integer->2di

Given an A3HT digit defined on a Class 2 grid calculate the corresponding 2di coord on the Class 1 grid one resolution finer.

```
BEGIN class2downOne
if digit = 0
    coord <- (0, 0)
else if digit = 1
    coord <- (1, 2)
else if digit = 2
    coord <- (1, -1)
else if digit = 3
    coord <- (2, 1)
else if digit = 4
    coord <- (-2, -1)
else if digit = 5
    coord <- (-1, 1)
else if digit = 6
    coord <- (-1, -2)
end if-else
return coord
END class2downOne
```

ALGORITHM class1downOne:integer->2di

Given an A3HT digit defined on a Class 1 grid calculate the corresponding 2di coord on the Class 2 grid one resolution finer.

```
BEGIN class1downOne
if digit = 0
    coord <- (0, 0)
else if digit = 1
    coord <- (-1, 1)
else if digit = 2
    coord <- (2, 1)
else if digit = 3
    coord <- (1, 2)
else if digit = 4
    coord <- (-1, -2)
else if digit = 5
    coord <- (-2, -1)
```

```
        else if digit = 6
            coord <- (1, -1)
        end if-else
        return coord
    END class1downOne
    Conversion from 2di pyramid coordinates to A3HT
```

The algorithm coord2di2A3HT gives an A3HT code corresponding to a 2di pyramid address. Algorithms used within this definition are given following the definition.

ALGORITHM coord2di2A3HT:2di×integer->A3HT

Convert 2di address coord of resolution finalRes to an A3HT code ndx.

```
BEGIN coord2di2A3HT
    if finalRes = 0
        return 0
    end if
    if finalRes = 1
        return 00
    end if
    oldSet <- null set
    newSet <- generateNextLevel(00)
    for res = 2 to finalRes - 1 step by 1
        oldSet <- newSet
        newSet <- null set
        for each ndx in oldSet
            if confirmedDescendent(ndx, coord, res)
                newSet <- generateNextLevel(ndx)
                break for
            else if possibleDescendent(ndx, coord, res)
                newSet <- newSet + generateNextLevel(ndx)
            end else-if
        end for
    end for
    for each ndx in newSet
        if coord = a3ht2Coord2di(ndx)
            return ndx
        end if
    end for
END coord2di2A3HT
```

ALGORITHM confirmedDescendent:A3HT×2di×integer->boolean

Determine whether or not the 2di address coord of resolution res is definitely a descendent of the A3HT code ndx. Note that the vector radius used in this algorithm is empirically derived.

```
BEGIN confirmedDescendent
    radius <- { 0, 0, 1, 1, 3, 4, 9, 13, 27, 40, 81, 121, 243, 364,
        729, 1093, 2187, 3280, 6561, 9841, 19683, 29524, 59049, 88573,
177147,
        265720, 531441, 797161, 1594323, 2391484}
    if isTypeA(ndx)
        resDiff <- res - resolution(ndx)
    else
        resDiff <- res - resolution(ndx) + 1
    end if-else
    if distance(coord, a3ht2Coord2di(resolve(ndx, res))) > radius(resDiff)
        return false
    else
        return true
    end if-else
END confirmedDescendent
```

ALGORITHM possibleDescendent:A3HT×2di×integer->boolean

Determine whether or not the 2di address coord of resolution res is possibly a descendent of the A3HT code ndx. Note that the vector radius used in this algorithm is empirically derived.

```
BEGIN possibleDescendent
    radius <- { 0, 0, 1, 2, 4, 8, 13, 26, 40, 80, 121, 242, 364, 728,
        1093, 2186, 3280, 6560, 9841, 19682, 29524, 59048, 88573,
177146,
        265720, 531440, 797161, 1594322, 2391484, 4782968}
    if isTypeA(ndx)
        resDiff <- res - resolution(ndx)
    else
        resDiff <- res - resolution(ndx) + 1
    end if-else
    if distance(coord, a3ht2Coord2di(resolve(ndx, res))) > radius(resDiff)
        return false
    else
        return true
    end if-else
END possibleDescendent
```

In addition to the algorithms for conversion from 2di coordinates to A3HT codes, we require an algorithm for rotating A3HT codes. To rotate an A3HT cell 60 degrees counter-clockwise about the center of the base A3HT generator cell perform the following substitution on all digits in the cell code:

| original digit | rotated digit |
| --- | --- |
| 0 | 0 |
| 1 | 5 |
| 2 | 3 |
| 3 | 1 |
| 4 | 6 |
| 5 | 4 |
| 6 | 2 |

For example, the hex A0506 (where A is the base cell code) rotated 60 degrees counter-clockwise would have a new address of A0402.

This algorithm can be efficiently implemented by creating separate tables for 60, 120, 180, 240, and 300 degrees, clockwise and counter-clockwise, through multiple application of the table above. Further efficiency can be gained by generating tables for multiple digit sub-sequences, rather than for single digits alone.

We now define an algorithm for conversion from q2di coordinates to iA3HT codes.

Note that the iA3HT base cells pictured in FIG. 17 correspond to resolution 1 of the q2di system. Thus q2di resolution 0 has no corresponding representation under iA3HT. Also note that the Class 1 axes of the q2di system illustrated in FIG. 5 are rotated 60 degrees clockwise relative to the iA3HT Class 1 axes shown in FIG. 17.

Let A^n be the resolution n iA3HT code consisting of the base code A followed by n−1 zero's. For example, the iA3HT coordinate 0600000 could be written 06^6. Note that all q2di coordinates of the form {r, [q, (0, 0)]} correspond to vertices of the icosahedron and map directly to iA3HT coordinates A^r, where A is the iA3HT base code corresponding to the origin of the quadrilateral q. Table 1 lists the corresponding iA3HT base code for each quadrilateral. Note that since quadrilaterals 0 and 11 consist of only a single origin cell, this table fully defines the transformation from these q2di quadrilaterals to iA3HT.

TABLE 1

Quadrilateral q vs. iA3HT base index A

| q | 0  | 1  | 2  | 3  | 4  | 5  | 6  | 7  | 8  | 9  | 10 | 11 |
|---|----|----|----|----|----|----|----|----|----|----|----|----|
| A | 00 | 10 | 06 | 07 | 08 | 09 | 21 | 22 | 23 | 24 | 25 | 31 |

Figure 19:
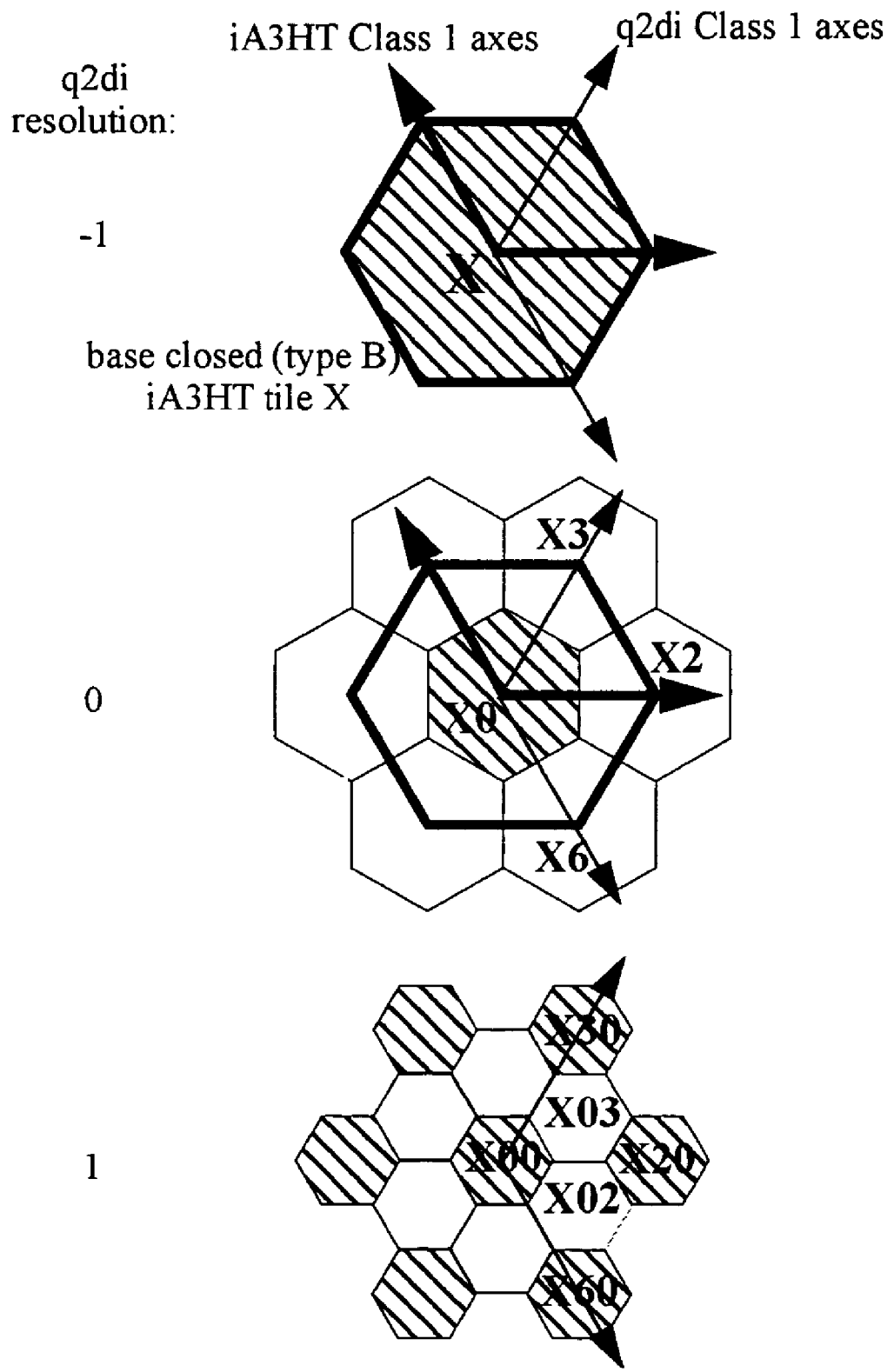
FIG. 19 shows a quadrilateral superimposed on an imaginary A3HT hierarchy.

Temporarily ignoring the complications introduced by the pentagon cells, it is useful to note that we can view each quadrilateral as lying on a closed A3HT generator two resolutions coarser than the base iA3HT tiles. FIG. 19 illustrates this relationship. The iA3HT Class 1 axes are shown in dashed lines, while the quadrilateral Class 1 axes are solid gray. Assuming the base closed A3HT generator has address X, FIG. 19 gives the corresponding codes for all A3HT cells coincident with the quadrilateral.

The iA3HT resolution 0 image in FIG. 19 provides the key to transforming from q2di to iA3HT codes. The basic steps for transforming a non-origin Class 1 q2di coordinate {r, [q, (i, j)]} to iA3HT are as follows:

1. Perform a transformation (as defined above) from 2di pyramid coordinate [r+1, (i, j)] to the corresponding A3HT code in the system defined by the Class 2 closed generator X (as shown in FIG. 19). Assume the 2di axes are aligned with the A3HT Class 1 axes (dashed axes in FIG. 19).
2. Rotate the A3HT address 60 degrees clock-wise to compensate for the q2di axes offset.
3. Replace the first 3 digits of the address with the corresponding iA3HT base cell code found in Table 2.

TABLE 2 iA3HT Base Cell Look-up

| Q2DI Quad q | A3HT Prefix | iA3HT Base Cell | Cell 00/31 Sub-Rotation | Interruption Prefix | Interruption Sub-rotation |
|---|---|---|---|---|---|
| 1 | X00 | 10 | — | — | — |
|   | X02 | 11 | — | — | — |
|   | X03 | 01 | — | — | — |
|   | X20 | 06 | — | 061 | 60° CW |
|   | X30 | 00 | 0° | — | — |
|   | X60 | 21 | — | — | — |
| 2 | X00 | 06 | — | — | — |
|   | X02 | 12 | — | — | — |
|   | X03 | 02 | — | — | — |
|   | X20 | 07 | — | 071 | 60° CW |
|   | X30 | 00 | 60° CCW | — | — |
|   | X60 | 22 | — | — | — |
| 3 | X00 | 07 | — | — | — |
|   | X02 | 13 | — | — | — |
|   | X03 | 03 | — | — | — |
|   | X20 | 08 | — | 081 | 60° CW |
|   | X30 | 00 | 120° CCW | — | — |
|   | X60 | 23 | — | — | — |
| 4 | X00 | 08 | — | — | — |
|   | X02 | 14 | — | — | — |
|   | X03 | 04 | — | — | — |
|   | X20 | 09 | — | 091 | 60° CW |
|   | X30 | 00 | 180° CCW | 001 | 60° CCW |
|   | X60 | 24 | — | — | — |
| 5 | X00 | 09 | — | — | — |
|   | X02 | 15 | — | — | — |
|   | X03 | 05 | — | — | — |
|   | X20 | 10 | — | 101 | 60° CW |
|   | X30 | 00 | 60° CW | — | — |
|   | X60 | 25 | — | — | — |
| 6 | X00 | 21 | — | 216 | 60° CW |
|   | X02 | 26 | — | — | — |
|   | X03 | 16 | — | — | — |

TABLE 2-continued iA3HT Base Cell Look-up

| Q2DI Quad q | A3HT Prefix | iA3HT Base Cell | Cell 00/31 Sub-Rotation | Interruption Prefix | Interruption Sub-rotation |
|---|---|---|---|---|---|
|   | X20 | 22 | — | — | — |
|   | X30 | 06 | — | — | — |
|   | X60 | 31 | 60° CW | — | — |
| 7 | X00 | 22 | — | 226 | 60° CW |
|   | X02 | 27 | — | — | — |
|   | X03 | 17 | — | — | — |
|   | X20 | 23 | — | — | — |
|   | X30 | 07 | — | — | — |
|   | X60 | 31 | 180° CCW | 316 | 60° CCW |
| 8 | X00 | 23 | — | 236 | 60° CW |
|   | X02 | 28 | — | — | — |
|   | X03 | 18 | — | — | — |
|   | X20 | 24 | — | — | — |
|   | X30 | 08 | — | — | — |
|   | X60 | 31 | 120° CCW | — | — |
| 9 | X00 | 24 | — | 246 | 60° CW |
|   | X02 | 29 | — | — | — |
|   | X03 | 19 | — | — | — |
|   | X20 | 25 | — | — | — |
|   | X30 | 09 | — | — | — |
|   | X60 | 31 | 60° CCW | — | — |
| 10 | X00 | 25 | — | 256 | 60° CW |
|   | X02 | 30 | — | — | — |
|   | X03 | 20 | — | — | — |
|   | X20 | 21 | — | — | — |
|   | X30 | 10 | — | — | — |
|   | X60 | 31 | 0° | — | — |

For most cells the resulting address will be the correct iA3HT address. In two cases additional adjustments are necessary. These adjustments require that the cell in question be rotated in 60 degree increments about its center-point. This transformation can be accomplished by translating the cell center to the origin, performing the rotation, and then translating the cell center back to its original position. In the case of A3HT cells the same effect can be achieved by applying the rotation algorithm to all digits except the base cell code. We call this a sub-rotation.

The first case requiring adjustment is that iA3HT base cells 0 and 31 require additional sub-rotations to account for their unique orientation relative to the quadrilaterals. These rotations are indicated in the fourth column of Table 2.

In the second case we must check for cases where the generated address lies on a deleted sub-sequence of an A3PT tile. These cases occur when the cell has a prefix as indicated in the fifth column of Table 2. In these cases we must perform the sub-rotation indicated in the sixth column so that the appropriate existing portion of the pentagon replaces the interruption.

Finally, note that, as previously discussed, Class 2 q2di cells are addressed using the codes of the next finer resolution Class 1 q2di grid. Given a Class 2 q2di address {r, [q, (i, j)]} first apply the above procedure for the address {r+1, [q, (i, j)]}. Since this address is, by definition, the Class 1 center cell of the desired Class 2 cell, the resulting iA3HT code will be the address of the desired Class 2 cell with an extra final digit of zero. Dropping this final zero digit from the code will give the correct code corresponding to the desired Class 2 resolution cell.

The above therefore describes, in a bucket, raster or vector system, path address-form location codes and a method of assigning these codes to objects represented using an aperture 3 hexagon discrete global grid system. As would be appreciated by those skilled in the art, the above description is not meant to be limiting, and the only limitations on the present invention are those set forth in the following claims.

The invention claimed is:

1. A method for assigning, in a vector system, path address-form location codes to objects represented using an aperture 3 hexagon discrete global grid system where each hexagon in a first resolution has seven hexagons associated therewith in a next finer resolution to the first resolution, said seven hexagons being centered on each of the vertices of the first resolution hexagon and on the center of the first resolution hexagon, the method comprising the steps of:
    a) with a computer, assigning a hexagon in a first resolution as an open generator type or a closed generator type;
    b) with a computer, specifying a linear code for the first resolution hexagon;
    c) if the first resolution hexagon is an open generator type, generating a single hexagon in the next finer resolution to the first resolution, said single hexagon being a closed generator type hexagon and centered in the first resolution hexagon;
    d) if the first resolution hexagon is a closed generator type, generating seven hexagons in the next finer resolution to the first resolution, the seven hexagons including a closed generator hexagon centered in the first resolution hexagon and the remaining six hexagons each being an open generator type and centered on the vertices of the first resolution hexagon, the seven hexagons in the next finer resolution covering an area extending beyond an area defined by the first resolution hexagon;
    e) with the computer, assigning an identifier to each of the hexagons in the next finer resolution generated from the first resolution hexagon; and
    f) with the computer, iteratively applying steps c) through e) to further finer resolutions until a desired resolution is achieved, wherein at each iteration a previously generated hexagon in the next finer resolution is used as the first resolution hexagon.

2. The method of claim 1, wherein the identifier is a decimal digit from 0 to 6.

3. The method of claim 2, where a variable length address is used and wherein decimal binary representation for the identifiers is used, and wherein decimal digit 7 can indicate address termination.

4. The method of claim 2, wherein a fixed length address is used and wherein digit 7 is used to indicate all remaining resolution digits are all center digits.

5. The method of claim 1, further comprising assigning a first resolution pentagon as a closed generator type, wherein the first resolution pentagon is associated with five hexagons and a pentagon in a next finer resolution to the first resolution, the five next finer resolution hexagons being centered on each of the vertices of the first resolution pentagon and the next finer resolution pentagon being centered with respect to the center of the first resolution pentagon.

6. The method of claim 1, wherein said path address-form location codes can be used on an icosahedron by centering a hexagonal base tile on every face of said icosahedron and centering a pentagonal base tile on every vertex of said icosahedron.

7. The method of claim 6 in which a fixed orientation is specified for each hexagon in said first resolution.

8. The method of claim 7, wherein said path address-form location code is indexed as a form selected from the group consisting of a character string code form; an integer code form; a modified integer code form; and a packed code form.

9. The method of claim 8 wherein said path address-form location codes are associated with locations on the surface of the earth.

10. The method of claim 1, wherein the desired resolution is selected based on an amount of available data storage.

11. One or more computer-readable storage media having computer-executable instructions for performing a method for assigning, in a vector system, path address-form location codes to objects represented using an aperture 3 hexagon discrete global grid system where each hexagon in a first resolution has seven hexagons associated therewith in a next finer resolution to the first resolution, said seven hexagons being centered on each of the vertices of the first resolution hexagon and on the center of the first resolution hexagon, the method comprising the steps of:
    a) with a computer, assigning a hexagon in a first resolution as an open generator type or a closed generator type;
    b) with a computer, specifying a linear code for a the first resolution hexagon;
    c) if the first resolution hexagon is an open generator type, generating a single hexagon in the next finer resolution to the first resolution, said single hexagon being a closed generator type hexagon and centered in the first resolution hexagon;
    d) if the first resolution hexagon is a closed generator type, generating seven hexagons in the next finer resolution to the first resolution, the seven hexagons including a closed generator hexagon centered in the first resolution hexagon and the remaining six hexagons each being an open generator type and centered on the vertices of the first resolution hexagon, the seven hexagons in the next finer resolution covering an area extending beyond an area defined by the first resolution hexagon;
    e) with the computer, assigning an identifier to each of the seven hexagons in the next finer resolution generated from the first resolution hexagon, the seven hexagons in the next finer resolution covering an area extending beyond an area defined by the first resolution hexagon; and
    f) with the computer, iteratively applying the assigning step steps c) through e) to further finer resolutions until a desired resolution is achieved, wherein at each iteration a previously generated hexagon in the next finer resolution is used as the first resolution hexagon.

12. A method for assigning, in a bucket or a raster system, path address-form location codes to objects represented using aperture 3 hexagon discrete global grid system, the method comprising the steps of:
    a) with a computer, assigning a hexagon in a first resolution as an open generator type or a closed generator type;
    b) with the computer, specifying a linear code for the first resolution hexagon;
    c) if the first resolution hexagon is an open generator type, generating a single hexagon in a next finer resolution to the first resolution, said single hexagon being a closed generator type hexagon and centered in the first resolution hexagon;
    d) if the first resolution hexagon is a closed generator type, generating seven hexagons in a next finer resolution to the first resolution, the seven hexagons including a closed generator hexagon centered in the first resolution hexagon and the remaining six hexagons each being an open generator type and centered on the vertices of the first resolution hexagon;

e) with the computer, adding a first identifier to a hexagon with the same center as the center of the first resolution hexagon and of the next finer resolution to the first resolution hexagon;

f) with the computer, inserting identifiers to any hexagons in the next finer resolution to the first resolution hexagon being centered on the vertices of the first resolution hexagon; and g) iteratively applying steps c)-f) to further finer resolutions of hexagons until a maximum resolution is achieved, wherein at each iteration a previously generated hexagon in the next finer resolution is used as the first resolution hexagon.

13. The method of claim 12, wherein the first identifier is a decimal digit 0.

14. The method of claim 13, wherein the identifiers for hexagons centered on the vertices of the first resolution hexagon are decimal digits 1 to 6.

15. The method of claim 14, wherein a variable length address is used and wherein decimal binary representation for the identifiers is used, and wherein decimal digit 7 indicates address termination.

16. The method of claim 14, wherein a fixed length address is used and wherein decimal digit 7 indicates address termination.

17. The method of claim 14, wherein a first order compression is applied to the single hexagon created from an open generator hexagon by eliminating redundant decimal zero digits.

18. The method of claim 12, further comprising assigning a pentagon in the first resolution.

19. The method of claim 18, further comprising assigning the pentagon in the first resolution as a closed generator type or an open generator type.

20. The method of claim 19, wherein if the first resolution pentagon is a closed generator type, the next finer resolution comprises a closed generator type pentagon centered at a center of said first resolution pentagon and five open generator type hexagons centered on the vertices of said first resolution pentagon, and wherein if the first resolution pentagon is an open generator type, said next finer resolution comprises a closed generator pentagon.

21. The method of claim 18 in which a fixed orientation is specified for each hexagon in said first resolution.

22. The method of claim 21, wherein said path address-form location code is indexed as a form selected from the group consisting of a character string code form; an integer code form; a modified integer code form; and a packed code form.

23. The method of claim 21 wherein said path address-form location codes are associated with locations on the surface of the earth.

24. A computer implemented method for assigning a path address code in an aperture 3 hexagon discrete grid system, comprising:

with a computer system, defining a first resolution hexagon with respect to a surface and defining the first resolution hexagon as an open generator type or a closed generator type;

with the computer system, specifying a linear code for the first resolution hexagon;

with the computer system, defining at least one aperture 3 second resolution hexagon in a resolution finer than the first resolution;

with the computer system, defining said at least one second resolution hexagon as a closed generator type if the first resolution hexagon is an open generator type, wherein the second resolution hexagon is centered with respect to a center of the first resolution hexagon;

with the computer system, defining said at least one second resolution hexagon as an open generator type if the first resolution hexagon is a closed generator type, wherein the second resolution hexagon is centered at a vertex of the first resolution hexagon;

with the computer system, including an identifier associated with said at least one second resolution hexagon in the linear code;

with the computer system, successively defining at least one aperture 3 hexagon in each of a succession of finer resolutions to reach a desired resolution; and with the computer system, including successive identifiers associated with the successively finer resolution hexagons in the linear code.

25. The method of claim 24, further comprising defining said at least one second resolution hexagon as a closed generator type if the first resolution hexagon is a closed generator type and said at least one second resolution hexagon is centered with respect to the center of the first resolution hexagon.

26. A computer implemented method for assigning location codes associated with an object position with reference to an icosahedral surface, comprising:

with a computer, assigning a plurality of hexagons and a plurality of pentagons in a first resolution and a first orientation class so as to cover the icosahedral surface;

with the computer, generating at least one second resolution aperture 3 hexagon in a second orientation class in association with each of the plurality of the first resolution hexagons and at least one second resolution aperture 3 pentagon in the second orientation class in association with each of the plurality of first resolution pentagons, wherein the second resolution is finer than the first resolution;

with the computer, assigning an index to each of the first and second resolution hexagons and pentagons;

with the computer, assigning a location code based on the indices;

with the computer, identifying all of the first resolution hexagons and the first resolution pentagons as being either closed or open;

if the first resolution hexagons and pentagons are identified as closed, generating open second resolution aperture 3 hexagons centered at each of the vertices of the first resolution hexagons and closed aperture 3 hexagons each centered in the first resolution hexagons, and generating open second resolution aperture 3 hexagons centered at each of the vertices of the first resolution pentagons and closed aperture 3 pentagons each centered in the first resolution pentagon; and if the first resolution hexagons and pentagons are identified as open, generating closed aperture 3 hexagons each centered in the first resolution hexagon, and generating closed aperture 3 pentagons each centered in the first resolution pentagon.

27. The method of claim 26, wherein the indices are decimal digits.

28. The method of claim 26, wherein the indices are 3 bit binary numbers.

29. One or more computer-readable storage media having computer-executable instructions for performing a method for assigning location codes associated with an object position with reference to an icosahedral surface, the method comprising:

with a computer, assigning a plurality of hexagons and a plurality of pentagons in a first resolution and a first orientation class so as to cover the icosahedral surface;

with the computer, generating at least one second resolution aperture 3 hexagon in a second orientation class in association with each of the plurality of the first resolution hexagons and at least one second resolution aperture 3 pentagon in the second orientation class in association with each of the plurality of first resolution pentagons, wherein the second resolution is finer than the first resolution;

with the computer, assigning an index to each of the first and second resolution hexagons and pentagons;

with the computer, assigning a location code based on the indices;

with the computer, identifying all of the first resolution hexagons and the first resolution pentagons as being either closed or open;

if the first resolution hexagons and pentagons are identified as closed, generating open second resolution aperture 3 hexagons centered at each of the vertices of the first resolution hexagons and closed aperture 3 hexagons each centered in a first resolution hexagon, and generating open second resolution aperture 3 hexagons centered at each of the vertices of the first resolution pentagons and closed aperture 3 pentagons each centered in the first resolution pentagon; and if the first resolution hexagons and pentagons are identified as open, generating closed aperture 3 hexagons each centered in the first resolution hexagon, and generating closed aperture 3 pentagons each centered in the first resolution pentagon.

* * * * *